United States Patent
Ang et al.

(10) Patent No.: US 9,614,379 B2
(45) Date of Patent: *Apr. 4, 2017

(54) ADAPTER, AND VEHICLE AND METHOD FOR PERFORMING POWER FEEDING USING ADAPTER

(75) Inventors: Wanleng Ang, Okazaki (JP); Ryouji Oki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 217 days.

This patent is subject to a terminal disclaimer.

(21) Appl. No.: 14/005,353

(22) PCT Filed: Mar. 23, 2011

(86) PCT No.: PCT/JP2011/056947
§ 371 (c)(1),
(2), (4) Date: Sep. 16, 2013

(87) PCT Pub. No.: WO2012/127649
PCT Pub. Date: Sep. 27, 2012

(65) Prior Publication Data
US 2014/0002011 A1 Jan. 2, 2014

(51) Int. Cl.
*H02J 7/00* (2006.01)
*B60L 11/18* (2006.01)
(Continued)

(52) U.S. Cl.
CPC ............. *H02J 7/00* (2013.01); *B60L 3/0069* (2013.01); *B60L 3/04* (2013.01); *B60L 7/14* (2013.01); *B60L 11/005* (2013.01); *B60L 11/14* (2013.01); *B60L 11/1818* (2013.01); *B60L 11/1824* (2013.01); *B60L 11/1838* (2013.01); *B60L 11/1842* (2013.01); *H01R 31/06* (2013.01); *H02J 13/0006* (2013.01); *B60L 2210/40* (2013.01); *B60L 2230/12* (2013.01); *H02J 7/022* (2013.01); *Y02E 60/721* (2013.01);
(Continued)

(58) Field of Classification Search
CPC .... H02J 5/005; H02J 7/025; H02J 7/00; H02J 7/0054; H02J 13/0006; H02J 15/00; H02J 2001/006; H02J 2007/0049; H02J 2007/0059; H02J 50/12; H02J 7/0036; H02J 7/0045; H02J 7/0047; H02J 7/0068
USPC .................................................. 320/101–110
See application file for complete search history.

(56) References Cited

U.S. PATENT DOCUMENTS

| 5,905,357 A | 5/1999 | Kawasaki |
| 2004/0155625 A1* | 8/2004 | Floyd .................... B60R 25/021 320/104 |

(Continued)

FOREIGN PATENT DOCUMENTS

| JP | A-2010-35277 | 2/2010 |
| WO | 2010/097922 A1 | 9/2010 |

*Primary Examiner* — Binh Tat
(74) *Attorney, Agent, or Firm* — Oliff PLC

(57) ABSTRACT

An adapter includes a signal generation unit. By connection between the adapter and a plug of a charging cable used when performing external charging with electric power from an external power supply, the signal generation unit supplies a signal instructing power feeding to a vehicle. In response to the signal instructing power feeding, the vehicle drives a power conversion device, thereby supplying electric power from the vehicle to an external electrical device through the charging cable.

20 Claims, 23 Drawing Sheets

(51) Int. Cl.
*B60L 3/00* (2006.01)
*B60L 3/04* (2006.01)
*B60L 7/14* (2006.01)
*B60L 11/00* (2006.01)
*B60L 11/14* (2006.01)
*H01R 31/06* (2006.01)
*H02J 13/00* (2006.01)
*H02J 7/02* (2016.01)

(52) U.S. Cl.
CPC ............ *Y02T 10/70* (2013.01); *Y02T 10/7005* (2013.01); *Y02T 10/7022* (2013.01); *Y02T 10/7077* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(56) References Cited

U.S. PATENT DOCUMENTS

| | | |
|---|---|---|
| 2005/0057225 A1 | 3/2005 | Marquet |
| 2007/0216348 A1* | 9/2007 | Shionoiri ................ B60L 8/003 320/107 |
| 2010/0219794 A1* | 9/2010 | Sugimoto ............. B60L 11/005 320/128 |
| 2011/0121779 A1 | 5/2011 | Ichikawa et al. |
| 2011/0148355 A1* | 6/2011 | Nakamura .......... B60L 11/1824 320/109 |
| 2011/0300753 A1 | 12/2011 | Ichikawa et al. |
| 2013/0154553 A1* | 6/2013 | Steele ................... B60L 11/182 320/108 |

* cited by examiner

ADAPTER, AND VEHICLE AND METHOD FOR PERFORMING POWER FEEDING USING ADAPTER

TECHNICAL FIELD

The present invention relates to an adapter, and a vehicle and a method for performing power feeding using the adapter, and more specifically to a technique for supplying electric power generated by a vehicle to an external electrical device.

BACKGROUND ART

In recent years, a vehicle equipped with a power storage device (for example, a secondary battery, a capacitor and the like) and running with driving force generated from the electric power stored in the power storage device has received attention as an environmentally-friendly vehicle. Such a vehicle includes, for example, an electric vehicle, a hybrid vehicle, a fuel-cell vehicle, and the like. There is a proposed technique for charging the power storage device mounted in the above-described vehicle by a commercial power supply having high power generation efficiency.

As a hybrid vehicle, there is also a known vehicle equipped with a power storage device that can be charged by a power supply external to the vehicle (hereinafter simply referred to as an "external power supply") as in the case of the electric vehicle (which will be hereinafter simply referred to as "external charging"). For example, the so-called "plug-in hybrid vehicle" is known which is provided with a power storage device that can be charged by a household power supply through the charging cable connecting between the power receptacle provided in the house and the charging port provided in the vehicle. Accordingly, it can be expected to improve the fuel consumption efficiency of the hybrid vehicle.

As for such an externally chargeable vehicle, there has been developed a concept of supplying electric power from a vehicle, which is regarded as a power supply source, to a commonly-used electrical device external to the vehicle, as seen in the smart grid and the like. Furthermore, a vehicle may be used as a power supply for using an electrical device when working outdoors, in camping or the like.

Japanese Patent Laying-Open No. 2010-035277 (PTL 1) discloses a charge/discharge system in which, for a vehicle capable of charging a battery mounted therein using a charging cable, electric power from the vehicle can be supplied to an electric load external to the vehicle by using a power cable exclusively for power feeding, which is different from the charging cable, and to which a power plug of the electric load external to the vehicle can be connected.

CITATION LIST

Patent Literature

PTL 1: Japanese Patent Laying-Open No. 2010-035277

SUMMARY OF INVENTION

Technical Problem

In the system disclosed in Japanese Patent Laying-Open No. 2010-035277 (PTL 1), however, a charging cable and a power feeding cable should be separately provided, which requires replacement of the power cable used between during charging and during power feeding. Consequently, two types of cables should be prepared to thereby increase the cost. Also, the user's operation may become complicated due to replacement of the cables.

The present invention has been made to solve the above-described problems. An object of the present invention is to provide, for an externally chargeable vehicle, a conversion adaptor for supplying electric power to an external electrical device from the vehicle using a power cable for charging.

Solution to Problem

An adapter according to the present invention serves as an adapter used for supplying electric power from a power source including a power storage device mounted in an externally chargeable vehicle to an electrical device external to the vehicle through a charging cable, the vehicle using electric power supplied from an external power supply through the charging cable to charge the power storage device. The adapter includes a first connection unit capable of connecting a power plug of the charging cable to be connected to the external power supply during external charging; and a second connection unit electrically connected to the first connection unit and capable of connecting a power plug of the electrical device.

Preferably, the adapter further includes a signal generation unit configured to generate a signal instructing power feeding by connection between the adapter and the charging cable. In response to the signal instructing power feeding, the vehicle supplies the electric power from the power source to the electrical device through the charging cable connected to the vehicle.

Preferably, the vehicle includes a power conversion device for converting the electric power from the power source to supply the converted electric power to the charging cable, and a first control device for controlling the power conversion device. The charging cable includes a second control device capable of transmitting and receiving a signal to and from the first control device. By connection between the adapter and the charging cable, the signal generation unit supplies, to the second control device, a signal showing the connection between the adapter and the charging cable to cause the second control device to output the signal instructing power feeding to the first control device. In response to the signal instructing power feeding, the first control device drives the power conversion device to supply the electric power from the power source to the electrical device.

Preferably, the signal generation unit changes a potential of a signal path connected to the second control device to supply the signal showing the connection between the adapter and the charging cable to the second control device.

Preferably, the signal generation unit includes a resistor and electrically connects the signal path to a ground through the resistor by connection between the adapter and the charging cable.

Preferably, the signal generation unit includes a switch and electrically connects the signal path to a ground via the switch by connection between the adapter and the charging cable.

Preferably, the charging cable includes a switching unit configured to switch between conduction and non-conduction between the signal path and a ground. The signal generation unit includes an operation member configured to allow a conducting state of the switching unit to be changed by connection between the adapter and the charging cable.

Preferably, the switching unit is a switch. The switch is in a conducting state in a state where the adapter and the charging cable are not connected. The operation member brings the switch into a non-conducting state by connection of the adapter to the charging cable.

Preferably, the signal generation unit outputs, to the second control device, a signal responding to reception of a signal transmitted from the second control device using a pair of power transmission paths in the charging cable as a signal showing connection between the adapter and the charging cable, to cause the second control device to output the signal instructing power feeding to the first control device.

Preferably, the signal generation unit includes a bypass circuit configured to branch a part of a high frequency signal transmitted from the second control device to one of the pair of power transmission paths, and output the branched signal to the second control device.

Preferably, the signal generation unit includes a filter circuit configured to cause a high frequency signal transmitted from the second control device to one of the pair of power transmission paths to pass through the other of the power transmission paths.

Preferably, the signal instructing power feeding is output from the second control device to the first control device, utilizing a pilot signal used for transmitting information about a current capacity of the charging cable, when performing external charging.

Preferably, the signal instructing power feeding is output using a frequency different from a frequency of the pilot signal used during external charging.

Preferably, the signal instructing power feeding is output using a potential different from a potential of the pilot signal used during external charging.

Preferably, the vehicle includes a power conversion device for converting the electric power from the power source to supply the converted electric power to the charging cable, and a control device for controlling the power conversion device. By connection between the adapter and the charging cable, the signal generation unit outputs the signal instructing power feeding to the control device through a signal line included in the charging cable. In response to the signal instructing power feeding, the control device drives the power conversion device to supply the electric power from the power source to the electrical device.

Preferably, the signal generation unit outputs, to the control device, a signal responding to reception of a signal transmitted from the control device through a pair of power transmission paths of the charging cable as the signal instructing power feeding.

A vehicle according to the present invention serves as a vehicle that is externally chargeable using electric power supplied from an external power supply through a charging cable to charge a power storage device mounted therein and is capable of feeding electric power to an external electrical device by connection of an adapter to the charging cable. The vehicle includes a power source including the power storage device; an inlet for connecting the charging cable during external charging; a power conversion device for converting electric power from the power source to supply the converted electric power to the inlet; and a first control device for controlling the power conversion device. The adapter includes a first connection unit capable of connecting a power plug of the charging cable to be connected to the external power supply during external charging, and a second connection unit electrically connected to the first connection unit and capable of connecting a power plug of the electrical device. In response to reception of a signal instructing power feeding that is generated by connection between the adapter and the charging cable, the first control device drives the power conversion device to supply the electric power from the power source to the electrical device.

Preferably, the power source further includes an internal combustion engine, and a rotating electric machine configured to be driven by the internal combustion engine to generate electric power. The electric power generated by the rotating electric machine is supplied to the electrical device through the charging cable and the adapter.

A method according to the present invention is a method for feeding electric power from a power source including a power storage device mounted in an externally chargeable vehicle to an external electrical device by connection of an adapter to a charging cable, in which the vehicle uses electric power supplied from an external power supply through the charging cable to charge the power storage device. The vehicle includes an inlet for connecting the charging cable during external charging, and a power conversion device for converting the electric power from the power source to supply the converted electric power to the inlet. The adapter includes a first connection unit capable of connecting a power plug of the charging cable to be connected to the external power supply during external charging, and a second connection unit electrically connected to the first connection unit and capable of connecting a power plug of the electrical device. The method includes the steps of: connecting the charging cable to the inlet; connecting the charging cable to the first connection unit of the adapter; connecting the power plug of the electrical device to the second connection unit of the adapter; receiving a signal instructing power feeding that is generated by connection between the adapter and the charging cable; and controlling the power conversion device in response to the signal instructing power feeding to supply the electric power from the power source to the electrical device.

Advantageous Effects of Invention

By using a conversion adaptor according to the present invention, it becomes possible to supply electric power from a vehicle to an external electrical device through a charging power cable used for external charging.

DESCRIPTION OF EMBODIMENTS

Figure 1:
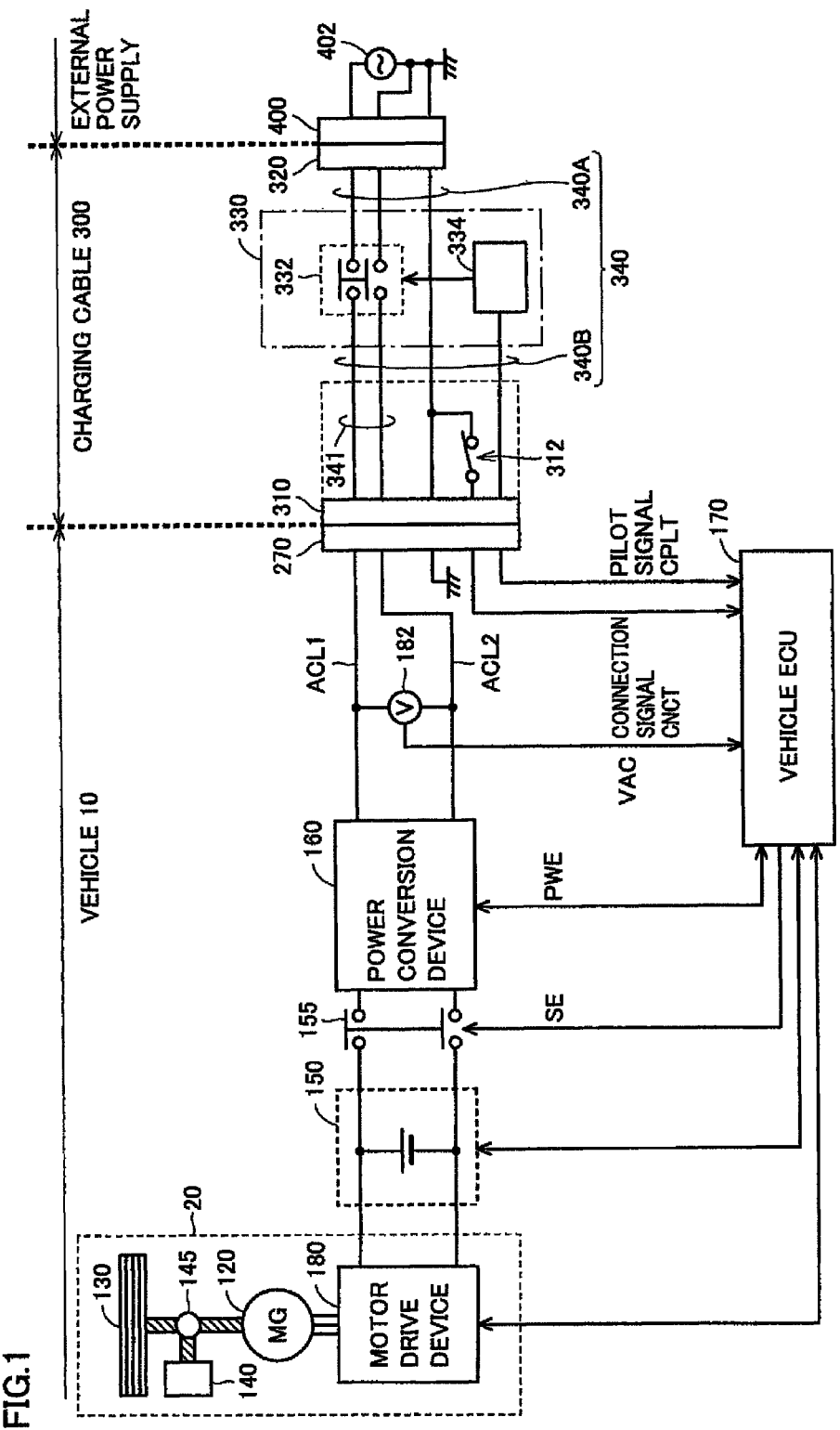
FIG. 1 is an entire block diagram of a charging system in a vehicle according to the present embodiment.

The embodiments of the present invention will be hereinafter described in detail with reference to the accompanying drawings, in which the same or corresponding components are designated by the same reference characters, and description thereof will not be repeated.

[Description of Charging System]

FIG. 1 is a schematic diagram of a charging system in a vehicle 10 according to the first embodiment. Explained with reference to FIG. 1 will be the case where the electric power from an external power supply 402 is used to charge a power storage device 150 mounted in vehicle 10.

It is to be noted that the configuration of vehicle 10 is not particularly limited as long as it can run with electric power from the power storage device that can be charged by an external power supply. Vehicle 10 may be, for example, a hybrid vehicle, an electric vehicle, a fuel-cell vehicle, and the like. Also, the configuration of vehicle 10 is applicable to any vehicle that, for example, runs with an internal combustion engine as long as it is provided with a chargeable power storage device.

Referring to FIG. 1, vehicle 10 includes an inlet 270, a power conversion device 160, a relay 155, a power storage device 150, a drive unit 20, a vehicle ECU (Electronic Control Unit) 170, and a voltage sensor 182. Drive unit 20 includes a motor drive device 180, a motor generator (which will be hereinafter also referred to as an "MG") 120, a driving wheel 130, an engine 140, and a power split device 145.

A connector 310 provided in a charging cable 300 is connected to inlet 270.

Power conversion device 160 is connected to inlet 270 through power lines ACL1 and ACL2. Furthermore, power conversion device 160 is connected to power storage device 150 through relay 155. Based on a control signal PWE from vehicle ECU 170, power conversion device 160 converts alternating-current (AC) power supplied from a power supply 402 external to the vehicle into a direct-current (DC) power with which power storage device 150 can be charged. Then, power conversion device 160 supplies the converted DC power to power storage device 150.

Power storage device 150 is a chargeable and dischargeable electric power storage component. Power storage device 150 is configured to include, for example, a secondary battery such as a lithium-ion battery, a nickel-metal hydride battery or a lead acid battery, or a power storage element such as an electric double layer capacitor.

Power storage device 150 stores the DC power supplied from power conversion device 160. Power storage device 150 is connected to motor drive device 180 driving MG 120, and supplies the DC power used for generating a driving force used for vehicle running. Furthermore, power storage device 150 stores the electric power generated by MG 120.

Although not shown, power storage device 150 further includes a voltage sensor for detecting a voltage of power storage device 150 and a current sensor for detecting a current that is input to and output from power storage device 150. Power storage device 150 outputs the detection values of the voltage and the current detected by these sensors to vehicle ECU 170.

Motor drive device 180 is connected to power storage device 150 and MG 120. Motor drive device 180 is controlled by vehicle ECU 170, to convert the electric power supplied from power storage device 150 into electric power for driving MG 120. Motor drive device 180 is configured, for example, to include a three-phase inverter.

MG 120 is connected to motor drive device 180 and also connected through power split device 145 to a driving wheel 130. MG 120 receives electric power supplied from motor drive device 180 to generate a driving force used for causing vehicle 10 to run. While MG 120 receives rotating force from driving wheel 130 to generate AC power and generates regenerative braking force by a regenerative torque command from vehicle ECU 170. MG 120 is configured to include, for example, a three-phase AC motor generator including a rotor having a permanent magnet embedded therein and a stator having a Y-connected three-phase coil.

MG 120 is connected also to engine 140 through power split device 145. Vehicle ECU 170 controls the driving forces of the engine and MG 120 to be set at an optimal ratio. Furthermore, when being driven by engine 140, MG 120 can also operate as a power generator. The electric power generated by MG 120 is stored in power storage device 150. Alternatively, the electric power generated by MG 120 may be supplied to electrical devices external to the vehicle through inlet 270 as described below.

Voltage sensor 182 is connected between power lines ACL1 and ACL2, and detects a voltage of the electric power supplied from external power supply 402. Then, voltage sensor 182 outputs a detection value VAC of the voltage to vehicle ECU 170.

Relay 155 is interposed in the path connecting power conversion device 160 and power storage device 150. Relay 155 is controlled by a control signal SE from vehicle ECU 170 to switch between supply and cut-off of the electric power between power conversion device 160 and power storage device 150. In addition, although the present embodiment shows the configuration in which relay 155 is separately provided, relay 155 may also be included in power storage device 150 or power conversion device 160.

Although not shown in FIG. 1, vehicle ECU 170 includes a CPU (Central Processing Unit), a storage device and an input/output buffer. Vehicle ECU 170 inputs the signal from each sensor and the like and outputs the control command to each device, and also controls vehicle 10 and each device. The control of these devices and the like is not limited to the process by means of software, but the process can be implemented by constructing dedicated hardware (an electronic circuit).

Vehicle ECU 170 receives a connection signal CNCT and a pilot signal CPLT from charging cable 300 through inlet 270. Furthermore, vehicle ECU 170 receives voltage detection value VAC of the received electric power from voltage sensor 182.

Vehicle ECU 170 receives inputs of detection values about a current, a voltage and a temperature from the sensor (not shown) installed within power storage device 150, to calculate the state amount showing the state of charge of power storage device 150 (which will be hereinafter also referred to as an "SOC (State of Charge)").

Then, based on these pieces of information, vehicle ECU 170 controls power conversion device 160, relay 155 and the like for charging power storage device 150.

Charging cable 300 includes a connector 310 provided at an end on the vehicle side; a plug 320 provided at an end on the external power supply side; a charging circuit interrupt device (which will be hereinafter also referred to as a "CCID") 330; and a power line unit 340 that connects between the devices and inputs/outputs electric power and a control signal.

Power line unit 340 includes a power line unit 340A connecting between plug 320 and CCID 330, and a power line unit 340B connecting between connector 310 and CCID 330. Furthermore, power line unit 340 includes a power line 341 for transmitting electric power from external power supply 402.

Charging cable 300 is connected to a receptacle 400 of external power supply 402 (for example, a commercial power supply) through plug 320 of charging cable 300. Furthermore, inlet 270 provided in the body of vehicle 10 and connector 310 of charging cable 300 are connected to each other to transmit the electric power to vehicle 10 from power supply 402 external to the vehicle. Charging cable 300 is detachable from and attachable to external power supply 402 and vehicle 10.

A connection detecting circuit 312 detecting connection of connector 310 is provided within connector 310 and detects the state of connection between inlet 270 and connector 310. Connection detecting circuit 312 outputs connection signal CNCT showing the connection state to vehicle ECU 170 of vehicle 10 through inlet 270.

Connection detecting circuit 312 may be configured as a limit switch as shown in FIG. 1, so as to cause the potential of connection signal CNCT to be a ground potential (0V) when connector 310 is connected to inlet 270. Alternatively, connection detecting circuit 312 may be configured as a resistor (not shown) having a prescribed resistance value, so as to cause the potential of connection signal CNCT to be decreased to a prescribed potential at the time of connection. In each case, vehicle ECU 170 detects the potential of connection signal CNCT to thereby detect that connector 310 has been connected to inlet 270.

CCID 330 includes a CCID relay 332 and a control pilot circuit 334. CCID relay 332 is interposed in a power line 341 within charging cable 300. CCID relay 332 is controlled by control pilot circuit 334. When CCID relay 332 is opened, the electric path is cut off within charging cable 300. On the other hand, when CCID relay 332 is closed, the electric power is supplied from external power supply 402 to vehicle 10.

Control pilot circuit 334 outputs pilot signal CPLT to vehicle ECU 170 through connector 310 and inlet 270. This pilot signal CPLT serves as a signal from control pilot circuit 334 for notifying vehicle ECU 170 about the rated current of charging cable 300. Furthermore, pilot signal CPLT also serves as a signal used for remote-controlling CCID relay 332 by vehicle ECU 170 based on the potential of pilot signal CPLT controlled by vehicle ECU 170. Also, control pilot circuit 334 controls CCID relay 332 based on the change in the potential of pilot signal CPLT.

The above-described pilot signal CPLT and connection signal CNCT, and the configuration such as a shape and a terminal arrangement of inlet 270, connector 310 and the like are standardized, for example, by SAE (Society of Automotive Engineers) in the U.S., Japan Electric Vehicle Association, and the like.

Figure 2:
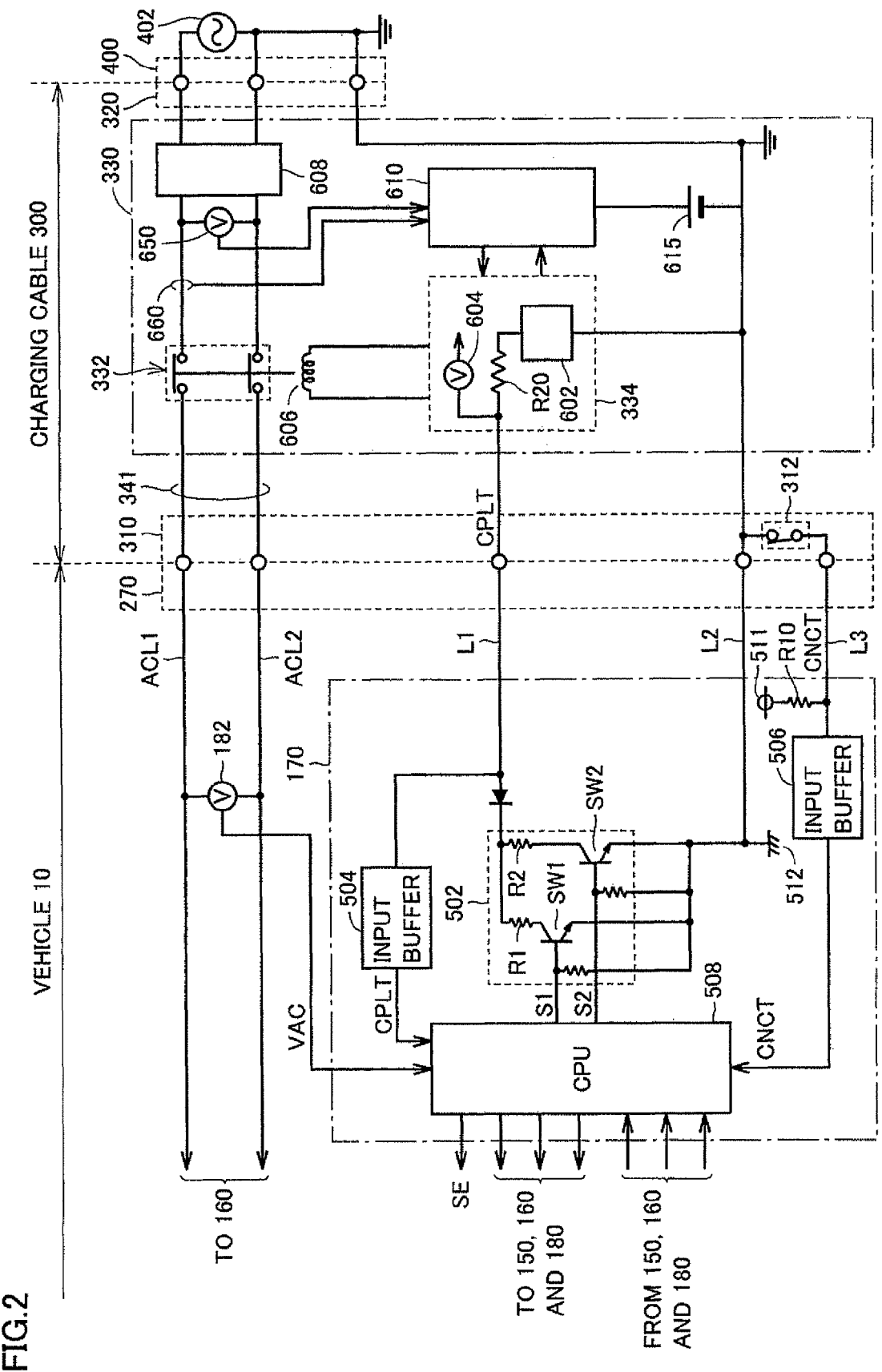
FIG. 2 is an example of a detailed diagram of a charging mechanism in FIG. 1.

FIG. 2 is a diagram for illustrating the charging circuit shown in FIG. 1 in greater detail. In FIG. 2, description of the components designated by the same reference characters as those in FIG. 1 will not be repeated.

Referring to FIG. 2, in addition to CCID relay 332 and control pilot circuit 334, CCID 330 further includes an electromagnetic coil 606, a leakage detector 608, a CCID control unit 610, a battery 615, a voltage sensor 650, and a current sensor 660. Furthermore, control pilot circuit 334 includes an oscillation device 602, a resistance R20 and a voltage sensor 604.

Although not shown, CCID control unit 610 includes a CPU, a storage device and an input/output buffer, and inputs/outputs the signals of each sensor and control pilot circuit 334 while controlling the charging operation of charging cable 300. CCID control unit 610 is supplied with a power supply from battery 615 incorporated in CCID 330.

When the potential of pilot signal CPLT detected by voltage sensor 604 is a prescribed potential (for example, 12V), oscillation device 602 outputs a non-oscillating signal. When the potential of pilot signal CPLT is decreased from the prescribed potential as mentioned above (for example, 9V), oscillation device 602 is controlled by CCID control unit 610, to output the signal oscillating at a prescribed frequency (for example, 1 kHz) and in a prescribed duty cycle.

In addition, the potential of pilot signal CPLT is controlled by vehicle ECU 170, as will be described with reference to FIG. 3. Furthermore, the duty cycle is set based on the rated current that can be supplied from external power supply 402 through charging cable 300 to vehicle 10.

When the potential of pilot signal CPLT is decreased from the prescribed potential as described above, pilot signal CPLT oscillates in a prescribed cycle. In this case, based on the rated current that can be supplied to vehicle 10 through charging cable 300 from external power supply 402, the pulse width of pilot signal CPLT is set. In other words, by the duty shown by the ratio of the pulse width to this oscillation cycle, vehicle ECU 170 of vehicle 10 is notified of the rated current by pilot signal CPLT from control pilot circuit 334.

Since the rated current is set for each charging cable, the rated current differs according to the types of charging cable 300. Therefore, the duty of pilot signal CPLT also differs according to the types of charging cable 300.

Based on the duty of pilot signal CPLT received through a control pilot line L1, vehicle ECU 170 can detect the rated current that can be supplied to vehicle 10 through charging cable 300.

When the potential of pilot signal CPLT is further decreased by vehicle ECU 170 (for example, 6V), control pilot circuit 334 supplies a current to electromagnetic coil 606. When receiving a current from control pilot circuit 334, electromagnetic coil 606 generates an electromagnetic force and closes the contact of CCID relay 332 to bring about a conducting state.

Leakage detector 608 is provided in the middle of power line 341 of charging cable 300 within CCID 330, and detects whether leakage occurs or not. Specifically, leakage detector 608 detects the equilibrium state of the current flowing through a pair of power lines 341 in the directions opposite to each other. Then, when the equilibrium state is disturbed, leakage detector 608 detects occurrence of leakage. Although not particularly shown, when leakage detector 608 detects leakage, power feeding to electromagnetic coil 606 is cut off and the contact of CCID relay 332 is opened to bring about a non-conducting state.

When plug 320 of charging cable 300 is inserted into receptacle 400, voltage sensor 650 detects the power supply voltage transmitted from external power supply 402, and notifies CCID control unit 610 of the detection value. Furthermore, current sensor 660 detects the charging current flowing through power line 341, and notifies CCID control unit 610 of the detection value.

Connection detecting circuit 312 included within connector 310 is, for example, a limit switch as described above, in which case the contact is closed in the state where connector 310 is connected to inlet 270 while the contact is opened in the state where connector 310 is disconnected from inlet 270.

In the state where connector 310 is disconnected from inlet 270, a voltage signal determined by the voltage on a power supply node 511 and a pull-up resistance R10 included in vehicle ECU 170 is generated as connection signal CNCT on a connection signal line L3. Furthermore, in the state where connector 310 is connected to inlet 270, connection signal line L3 is short-circuited to a ground line L2, with the result that the potential on connection signal line L3 becomes a ground potential (0V).

It is to be noted that connection detecting circuit 312 can also be a resistor (not shown). In this case, in the state where connector 310 is connected to inlet 270, a voltage signal determined by the voltage on power supply node 511, pull-up resistance R10 and this resistor is generated on connection signal line L3.

Even if connection detecting circuit 312 is a limit switch or a resistor as described above, the potential generated on connection signal line L3 (that is, the potential of connection signal CNCT) varies between the time when connector 310 is connected to inlet 270 and the time when connector 310 is disconnected from inlet 270. Therefore, vehicle ECU 170 can detect the connection state of connector 310 by detecting the potential of connection signal line L3.

In vehicle 10, in addition to power supply node 511 and pull-up resistance R10 described above, vehicle ECU 170 further includes a resistance circuit 502, input buffers 504, 506, and a CPU 508.

Resistance circuit 502 includes pull-down resistances R1, R2, and switches SW1 and SW2. Pull-down resistance R1 and switch SW1 are connected in series between a vehicle ground 512 and control pilot line L1 through which pilot signal CPLT is communicated. Pull-down resistance R2 and switch SW2 are also connected in series between control pilot line L1 and vehicle ground 512. Switches SW1 and SW2 are controlled in accordance with control signals S1 and S2, respectively, from CPU 508 to be brought into a conducting state or a non-conducting state.

This resistance circuit 502 serves to control the potential of pilot signal CPLT from the vehicle 10 side.

Input buffer 504 receives pilot signal CPLT on control pilot line L1, and outputs the received pilot signal CPLT to CPU 508. Input buffer 506 receives connection signal CNCT through connection signal line L3 connected to connection detecting circuit 312 of connector 310, and outputs the received connection signal CNCT to CPU 508. As described above, vehicle ECU 170 applies a voltage to connection signal line L3, and the potential of connection signal CNCT is changed by connection of connector 310 to inlet 270. CPU 508 detects the potential of this connection signal CNCT, thereby detecting the connection state of connector 310.

CPU 508 receives pilot signal CPLT and connection signal CNCT from input buffers 504 and 506, respectively.

CPU 508 detects the potential of connection signal CNCT, and detects the connection state of connector 310.

Furthermore, CPU 508 detects the oscillation state and the duty cycle of pilot signal CPLT, thereby detecting the rated current of charging cable 300 as described above.

Then, based on the potential of connection signal CNCT and the oscillation state of pilot signal CPLT, CPU 508 controls control signals S1 and S2 of switches SW1 and SW2, respectively, thereby controlling the potential of pilot signal CPLT. Consequently, CPU 508 can remotely operate CCID relay 332. Then, electric power is transmitted from external power supply 402 to vehicle 10 through charging cable 300.

Referring to FIGS. 1 and 2, when the contact of CCID relay 332 is closed, the AC power from external power supply 402 is supplied to power conversion device 160, and then, the preparation for charging power storage device 150 from external power supply 402 is completed. CPU 508 outputs a control signal PWE to power conversion device 160, thereby converting the AC power from external power supply 402 into a DC power that can be supplied to power storage device 150. Then, CPU 508 outputs control signal SE and closes the contact of relay 155, thereby charging power storage device 150.

Figure 3:
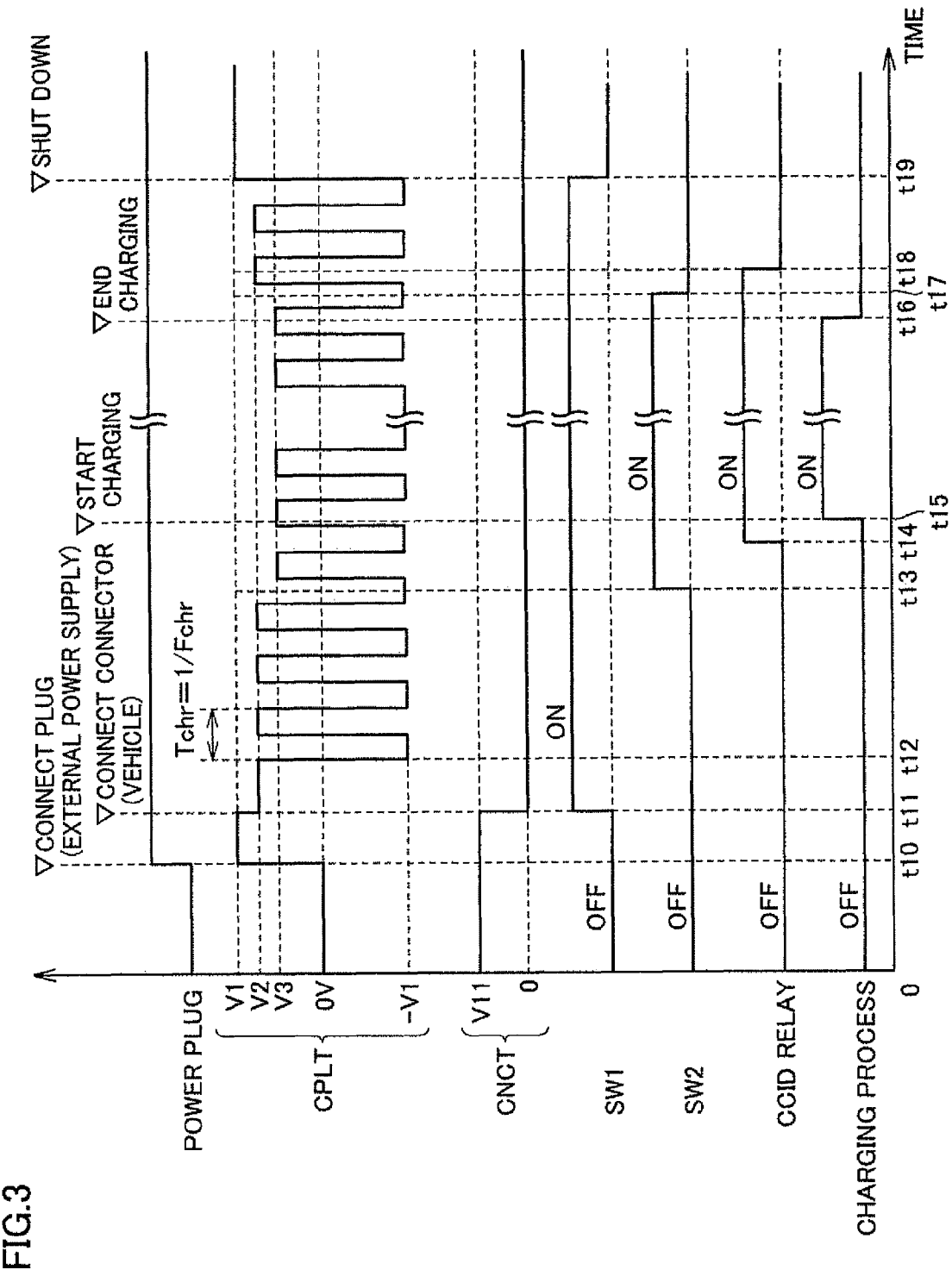
FIG. 3 is a time chart for illustrating charging control in the case where external charging is performed.

FIG. 3 is a time chart for illustrating charging control in the charging system in FIG. 2. In FIG. 3, the horizontal axis shows time while the vertical axis shows the state of connection of plug 320 to external power supply 402, the potential of pilot signal CPLT, the potential of connection signal CNCT, the states of switches SW1 and SW2, the state of CCID relay 332, and the execution state of the charging process.

Referring to FIGS. 2 and 3, charging cable 300 is not connected to vehicle 10 and external power supply 402 until time t10. In this state, switches SW1, SW2 and CCID relay 332 are in the OFF state while the potential of pilot signal CPLT is 0V. Furthermore, the potential of connection signal CNCT is V11 (>0V), At time t10. when plug 320 of charging cable 300 is connected to receptacle 400 of external power supply 402, control pilot circuit 334 generates pilot signal CPLT.

It is to be noted that connector 310 of charging cable 300 is not connected to inlet 270 at this time t10. Also, the potential of pilot signal CPLT is V1 (for example, 12V) while pilot signal CPLT is in the non-oscillation state.

At time t11. when connector 310 is connected to inlet 270, the potential of connection signal CNCT is decreased by connection detecting circuit 312.

Then, CPU 508 detects that the potential of connection signal CNCT has been decreased, thereby detecting connection between connector 310 and inlet 270. In response to this, control signal S1 is activated by CPU 508, and switch SW1 is turned on. Then, the potential of pilot signal CPLT is decreased to V2 (for example, 9V) by pull-down resistance R1 of resistance circuit 502.

At time t12. CCID control unit 610 detects that the potential of pilot signal CPLT has been decreased to V2. In response to this, CCID control unit 610 oscillates pilot signal CPLT in an oscillation cycle Tchr (=1/Fchr). It is to be noted that Fchr shows an oscillation frequency.

When detecting that pilot signal CPLT has been oscillated, CPU 508 detects the rated current of charging cable 300 by the duty of pilot signal CPLT as described above.

Then, in order to start a charging operation, CPU 508 activates control signal S2 to turn on switch SW2. In response to this, the potential of pilot signal CPLT is decreased to V3 (for example, 6V) by pull-down resistance R2 (time t13 in FIG. 3).

When CCID control unit 610 detects that the potential of this pilot signal CPLT has been decreased to V3. the contact of CCID relay 332 is closed at time t14. to transmit the electric power from external power supply 402 to vehicle 10 through charging cable 300.

Then, when an AC voltage VAC is detected in vehicle 10, the contact of relay 155 (FIG. 1) is closed by CPU 508 and power conversion device 160 (FIG. 1) is controlled, thereby starting to charge power storage device 150 (FIG. 1) (time t15 in FIG. 3).

When charging of power storage device 150 proceeds and it is determined that power storage device 150 is fully charged, CPU 508 ends the charging process (time t16 in FIG. 3). Then, CPU 508 deactivates control signal S2, to bring switch SW2 into a non-conducting state (time t17 in FIG. 3). Consequently, the potential of pilot signal CPLT becomes V2. and accordingly, the charging process is stopped while CCID relay 332 is brought into a non-conducting state (time t18), thereby ending the charging operation. Then, CPU 508 deactivates control signal S1 to bring switch SW1 into a non-conducting state, thereby shutting down the system.

[First Embodiment]

In such an externally chargeable vehicle as described above, it is possible to store the electric power from the power supply external to the vehicle such as a commercial power supply in the power storage device of the vehicle.

On the other hand, as in the so-called smart grid, it has been studied that electric power stored in a vehicle, which is regarded as a power supply source, is supplied to electrical devices and power networks external to the vehicle, Furthermore, a vehicle may be used as a power supply for using an electrical device when working outdoors, in camping or the like.

Figure 4:
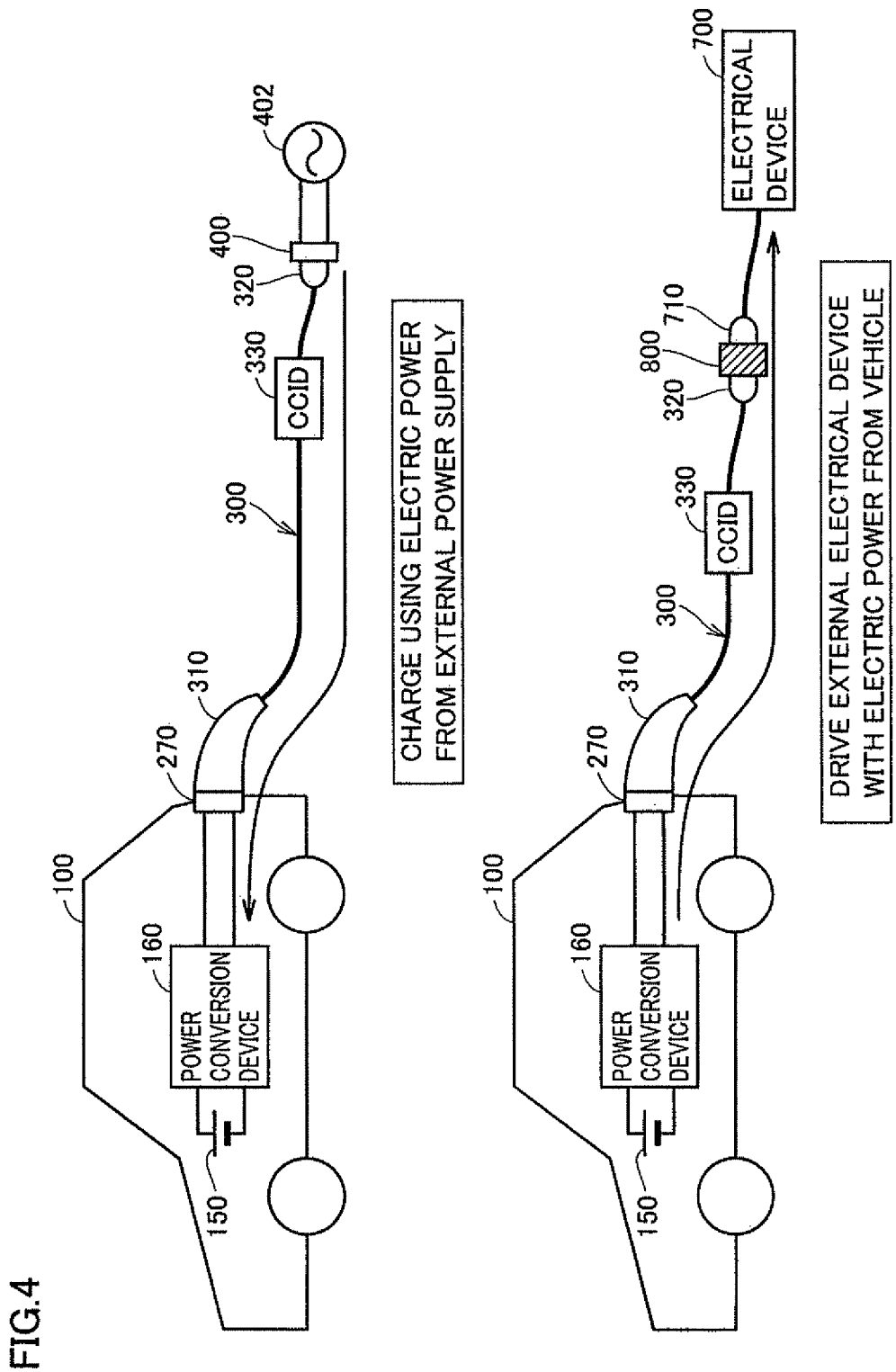
FIG. 4 is a schematic diagram for illustrating the outline of the present embodiment.

In this case, as shown in FIG. 4, it is suitable if electric power can be supplied from the vehicle by utilizing charging cable 300 used when performing external charging, since it is not necessary to separately provide an outlet for connecting electrical devices, which not only can obviate or eliminate the need to modify the vehicle, but also can eliminate the need to prepare the power cable dedicated to power feeding.

Thus, in the first embodiment, a conversion adapter 800 is provided as shown in the lower section in FIG. 4. To this conversion adapter 800, plug 320 of charging cable 300 used during external charging and a power plug 710 of an electrical device 700 external to the vehicle can be connected. Also this conversion adapter 800 allows the electric power from vehicle 10 to be supplied to electrical device 700 external to the vehicle through charging cable 300 (which will be hereinafter referred to as "power feeding to outside").

By connecting this adapter 800, as described below, power conversion device 160 of vehicle 10 converts the DC power stored in power storage device 150 serving as a power source into AC power that can be used in electrical device 700 (for example, AC 100V, 200V and the like), and the converted power is supplied to electrical device 700.

In addition to the above-described power storage device 150, examples of a power source of vehicle 10 include engine 140 and motor generator 120 in the case of a hybrid vehicle provided with engine 140 as shown in FIG. 1. In this case, the electric power (AC power) generated by engine 140 driving motor generator 120 is converted by motor drive device 180 and power conversion device 160 into AC power that can be used in electrical device 700. Then, the converted power is supplied to electrical device 700. Although not shown in FIG. 1, it is also possible to use electric power from an auxiliary battery for supplying a power supply voltage to auxiliary machinery included in vehicle 10. Alternatively, if vehicle 10 is a fuel-cell vehicle, it is also possible to supply the electric power generated by a fuel cell.

Therefore, in the first embodiment, in addition to the above-described function of converting the electric power from external power supply 402 into charge power for power storage device 150, power conversion device 160 should have a function of converting the electric power stored in vehicle 10 and/or the electric power generated in vehicle 10 into driving electric power for external electrical device 700. In addition, as for power conversion device 160, one power conversion device capable of bidirectionally converting electric power between external charging and power feeding to outside may be provided, or a power conversion device exclusively for external charging and a power conversion device exclusively for power feeding to outside may be separately provided.

Figure 5:
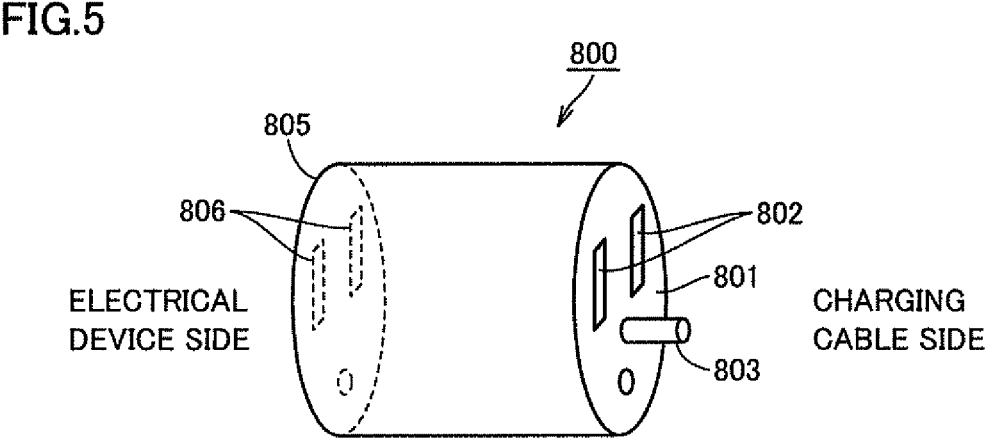
FIG. 5 is a diagram showing the outline of an adapter according to the present embodiment.

FIG. 5 is a schematic diagram showing an example of adapter 800 used during power feeding to outside, as described with reference to FIG. 4.

Referring to FIGS. 4 and 5, adapter 800 includes a connection unit 801 for connecting plug 320 of charging cable 300 and a connection unit 805 for connecting power plug 710 of external electrical device 700.

Figure 6:
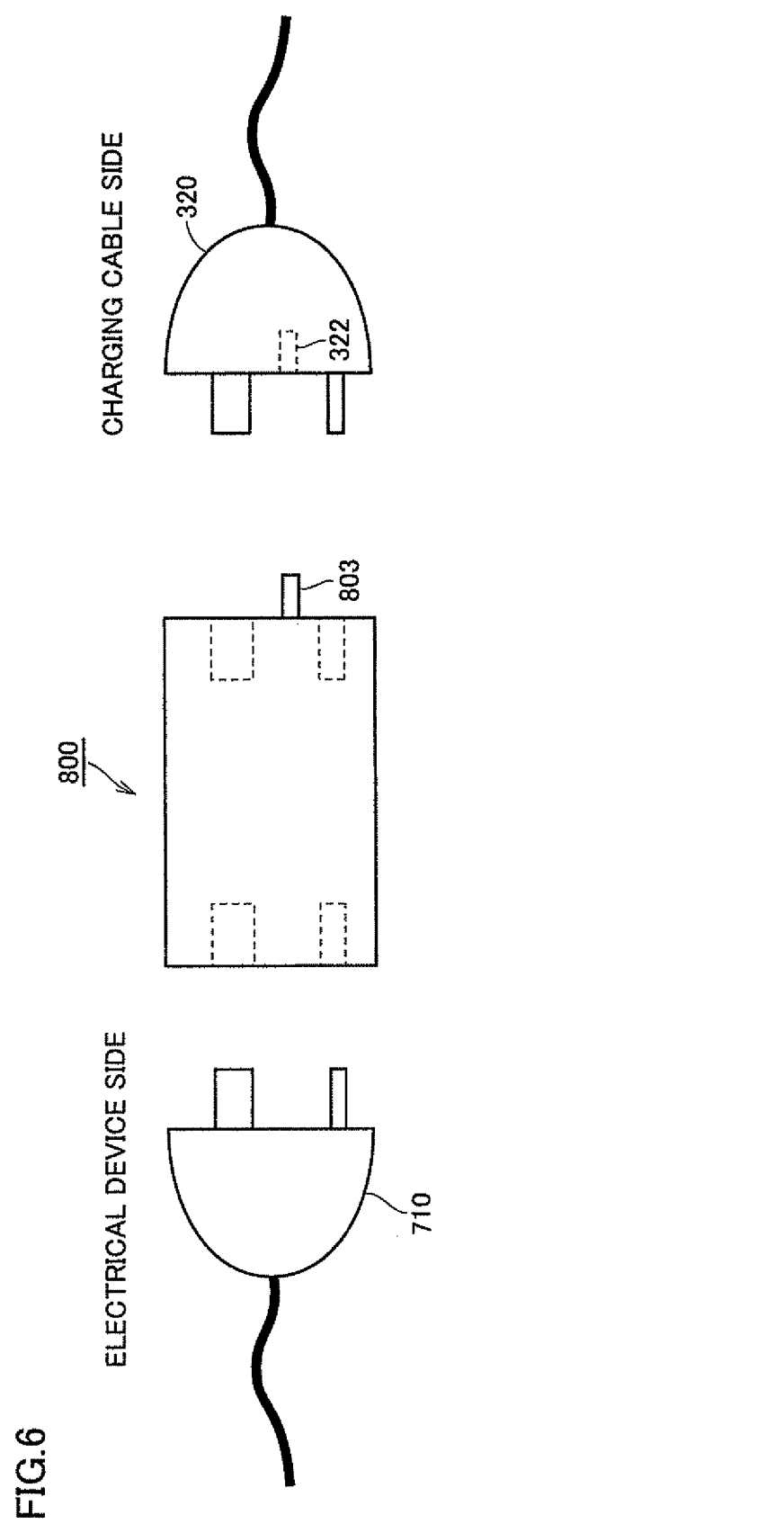
FIG. 6 is a diagram for illustrating the adapter in FIG. 5.

Connection unit 801 on the charging cable 300 side is provided with a terminal unit 802 to which the terminal of plug 320 is connected. Also, connection unit 801 is further provided with a terminal 803 for transmitting a signal showing connection between adapter 800 and plug 320. As shown in FIG. 6, plug 320 is provided with a terminal unit 322 accommodating terminal 803. When plug 320 and adapter 800 are connected to each other, terminal 803 and terminal unit 322 are electrically coupled.

Furthermore, connection unit 805 on the, electrical device 700 side is provided with a terminal unit 806 corresponding to the terminal shape of power plug 710 of electrical device 700. Terminal unit 806 has a shape that is, for example, adapted to a voltage (100V, 200V and the like) to be used and the standards specified in the country in which this terminal unit is to be used.

Figure 7:
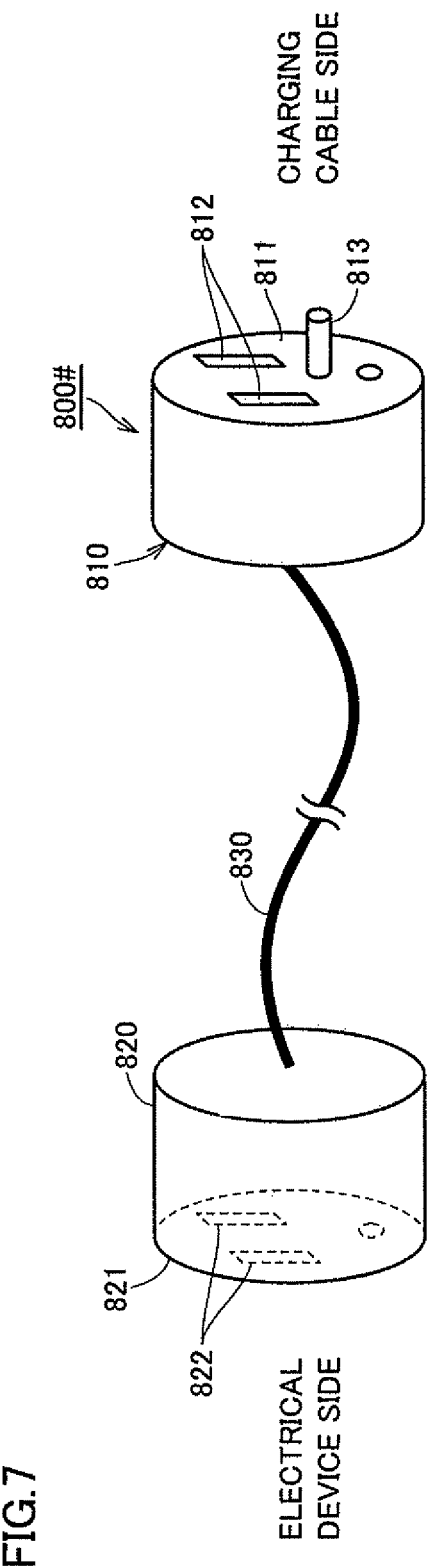
FIG. 7 is a schematic diagram of another example of the adapter according to the present embodiment.

FIG. 5 shows an example in which connection units 801 and 805 are integrally structured and housed in the same housing, which may be however configured, for example as with an adapter 800# shown in FIG. 7, such that a connector 810 on the charging cable 300 side and a connector 820 on the electrical device 700 side can be separated from each other, and coupled to each other through a cable 830 serving as a power transmission medium.

Then explained will be a circuit configuration used when adapter 800 is used and charging cable 300 is used to supply electric power from vehicle 10 to electrical device 700.

Figure 8:
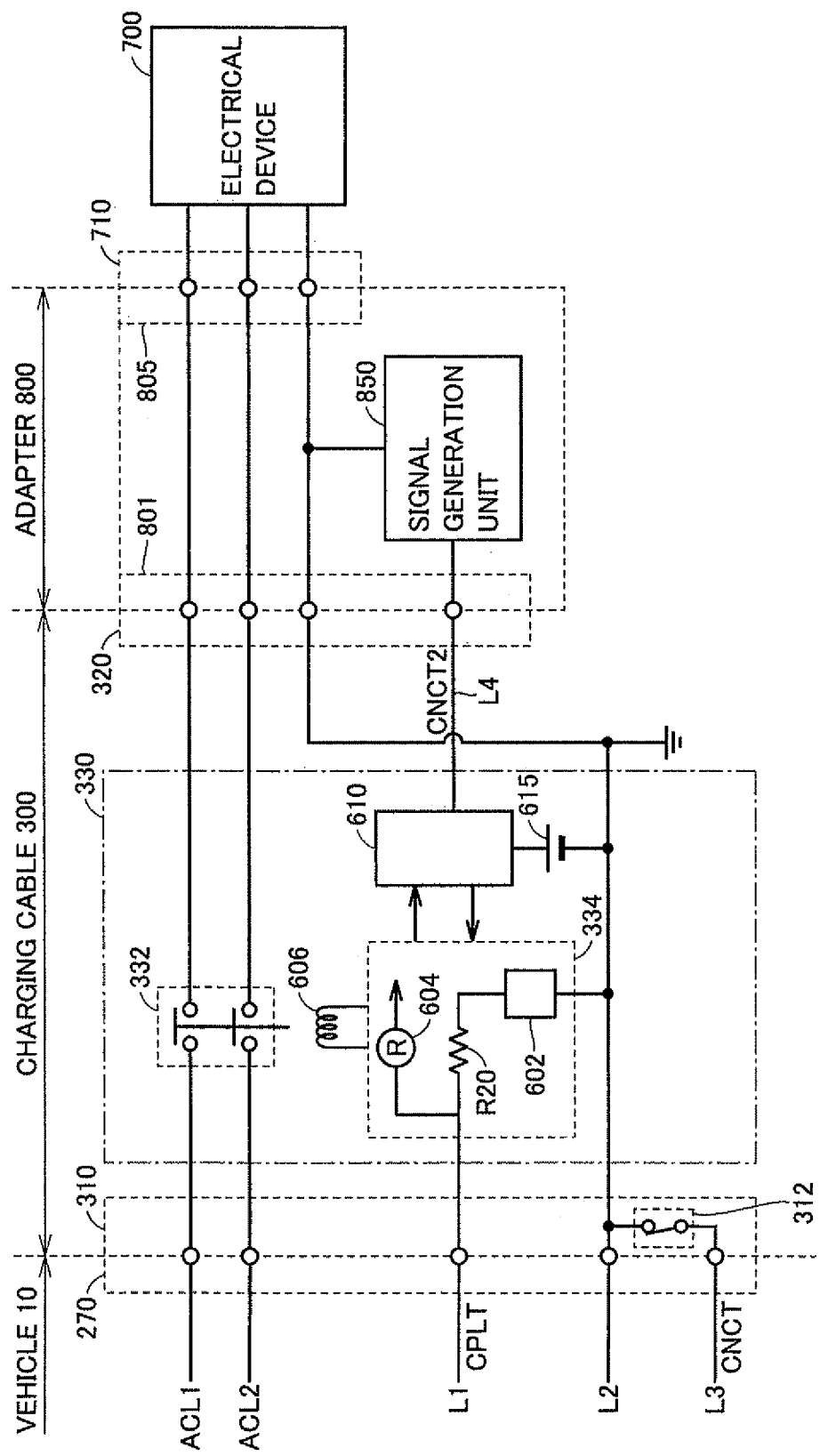
FIG. 8 is a detailed diagram of a circuit in the case where power feeding is performed through a charging cable by using the adapter in the first embodiment.

FIG. 8 is a detailed diagram of a circuit in the case where adapter 800 according to the first embodiment is used for power feeding. The configuration of vehicle 10 is the same as that in FIG. 2, and components in vehicle 10 and charging cable 300 are partially not shown in FIG. 8. The same components as those in FIG. 2 will not be explained in FIG. 8.

Referring to FIG. 8, adapter 800 includes a signal generation unit 850 in addition to connection units 801 and 805.

When plug 320 of charging cable 300 is connected to adapter 800, signal generation unit 850 is electrically connected to a signal line L4 of charging cable 300. When being connected to signal line L4, signal generation unit 850 supplies, to CCID control unit 610 of charging cable 300, a signal CNCT2 showing connection between charging cable 300 and adapter 800. While a specific example of signal generation unit 850 will be explained in and after FIG. 15, signal generation unit 850 may be a control device having a CPU or may be a control circuit exhibiting a desired function. When signal generation unit 850 requires a power supply voltage for driving, the power supply voltage is supplied from the battery (not shown) incorporated in adapter 800.

Based on signal CNCT2 from signal generation unit 850, CCID control unit 610 determines whether or not charging cable 300 and adapter 800 are connected to each other. When determining that charging cable 300 and adapter 800 are connected to each other, CCID control unit 610 outputs pilot signal CPLT to vehicle ECU 170 using a frequency and/or a potential different from those during external charging. Consequently, CCID control unit 610 can cause vehicle ECU 170 to perform a power feeding operation.

Figure 9:
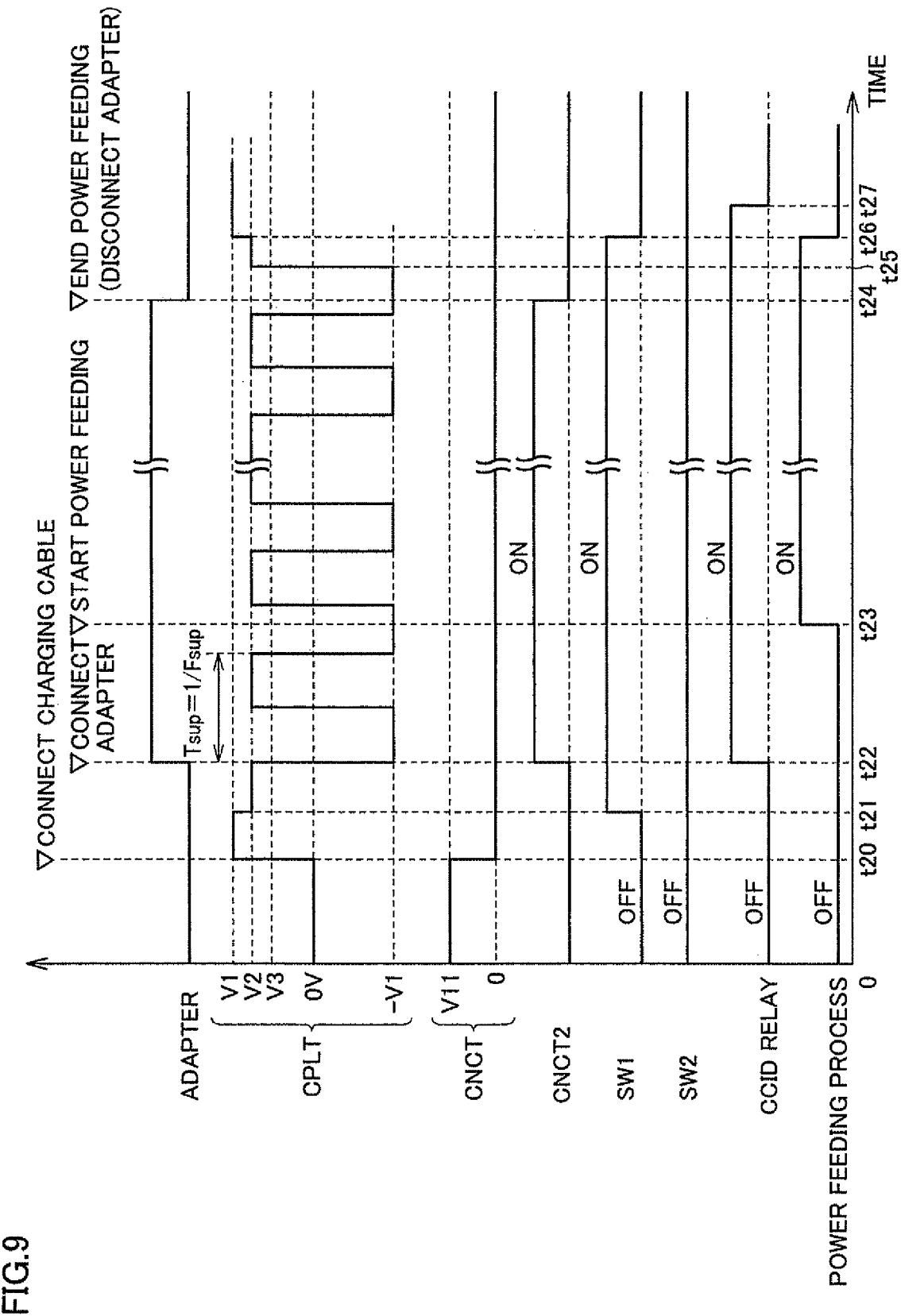
FIG. 9 is a time chart for illustrating control during power feeding in the first embodiment.

FIG. 9 is a time chart for illustrating the power feeding control in the first embodiment. In FIG. 9, the horizontal axis shows time while the vertical axis shows the state of connection of adapter 800, the potential of pilot signal CPLT, the potential of connection signal CNCT, the state of connection signal CNCT2, the states of switches SW1 and SW2, the state of CCID relay 332, and the execution state of the power feeding process.

Referring to FIGS. 8 and 9, charging cable 300 is not connected to inlet 270 until time t20. In this state, switches SW1, SW2 and CCID relay 332 are in the OFF state while the potential of pilot signal CPLT is 0V. Furthermore, the potential of connection signal CNCT is V11 (>0V) while connection signal CNCT2 is in the OFF state.

At time t20. when charging cable 300 is connected to inlet 270, CCID 330 generates pilot signal CPLT. At this time t20. the potential of pilot signal CPLT is V1 (for example, 12V) and pilot signal CPLT is in a non-oscillation state.

Furthermore, when charging cable 300 is connected, the potential of connection signal CNCT is decreased by connection detecting circuit 312. CPU 508 detects that the potential of connection signal CNCT has been decreased, thereby detecting that charging cable 300 has been connected to inlet 270. In response to this, CPU 508 activates control signal S1 to thereby turn on switch SW1 (time t21). Thus, as described with reference to FIG. 3, the potential of pilot signal CPLT is decreased to V2 (for example, 9V) by pull-down resistance R1 of resistance circuit 502.

At time t22. when plug 320 of charging cable 300 is connected to adapter 800, signal generation unit 850 of adapter 800 is brought into the ON state. Thereby, CCID control unit 610 recognizes that plug 320 of charging cable 300 has been connected to adapter 800. In response to this, CCID control unit 610 oscillates pilot signal CPLT in an oscillation cycle Tsup (=1/Fsup) longer than an oscillation cycle Tchr in the case of external charging in FIG. 3. That is, Tchr<Tsup (Fchr>Fsup). Furthermore, at time t22. CCID control unit 610 closes CCID relay 332.

CPU 508 detects that pilot signal CPLT has been oscillated. However, as described above, since an oscillation frequency Fsup of pilot signal CPLT output from CCID 330 during the power feeding operation is lower than an oscillation frequency Fehr during the charging operation, CPU 508 recognizes based on this difference between the oscillation frequencies that adapter 800 has been connected to charging cable 300 and that the power feeding operation has been instructed.

Then, CPU 508 closes the contact of relay 155 while controlling power conversion device 160 (FIG. 1), thereby starting to supply electric power from power storage device 150 (FIG. 1) to electrical device 700 (time t23).

Then, at time t24. when adapter 800 is disconnected from charging cable 300 to turn connection signal CNCT2 to be OFF, CCID control unit 610 stops the oscillation of pilot signal CPLT (time t25). In response to this, CPU 508 stops the power feeding process and also turns switch SW1 to be OFF (time t26). Then, CCID relay 332 is interrupted by CCID control unit 610 at time t27.

Figure 10:
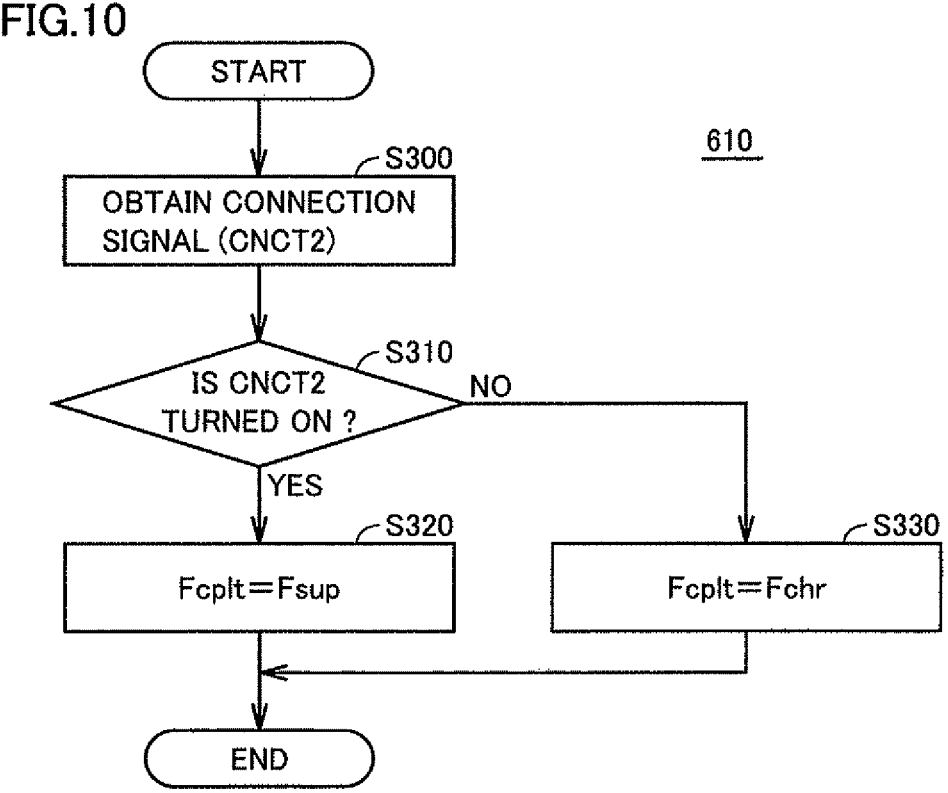
FIG. 10 is a flowchart for illustrating a control process for selecting a frequency of a pilot signal that is performed in a CCID control unit in the first embodiment.
Figure 13:
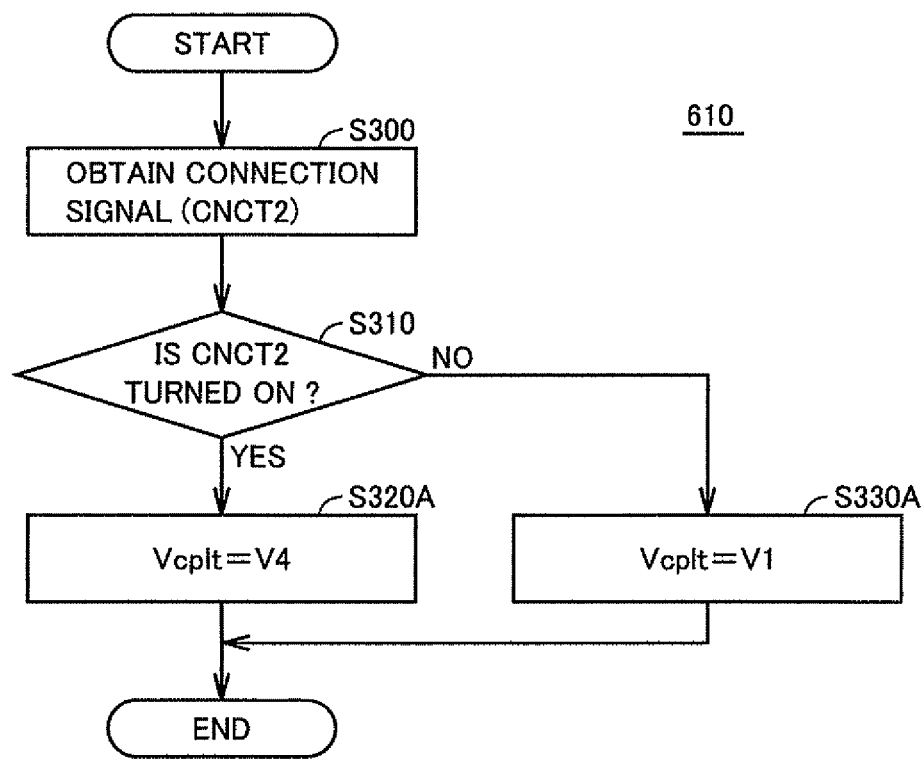
FIG. 13 is a flowchart for illustrating a control process for selecting a voltage of a pilot signal that is performed in the CCID control unit in the modification of the first embodiment.
Figure 21:
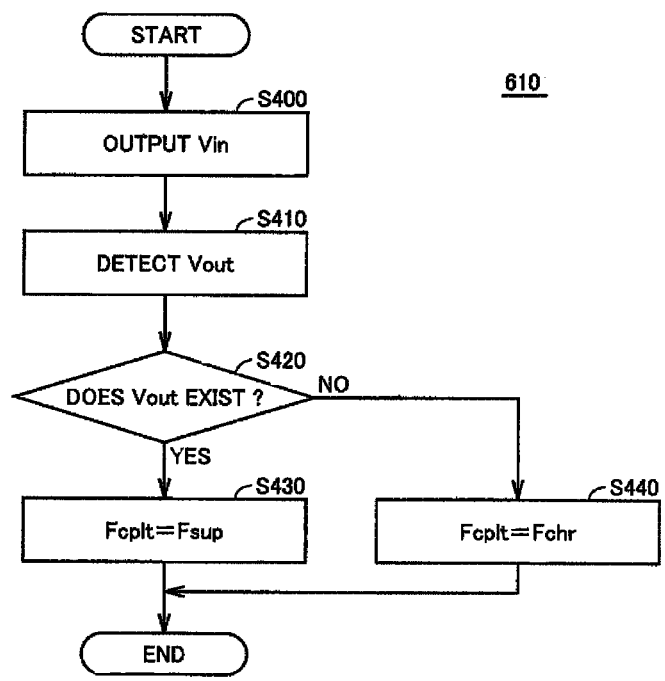
FIG. 21 is a flowchart for illustrating a control process for selecting a frequency of a pilot signal that is performed in the CCID control unit in FIG. 18.

FIG. 10 is a flowchart for illustrating a control process for selecting a frequency of pilot signal CPLT that is performed in CCID control unit 610 in the first embodiment. In the flowcharts of FIG. 10 and FIGS. 13 and 21 which will be described later, the process is implemented by executing the program stored in CCID control unit 610 in advance in predetermined cycles. Alternatively, in some of the steps, the process can be implemented by constructing dedicated hardware (an electronic circuit).

Referring to FIGS. 8 and 10, CCID control unit 610 obtains connection signal CNCT2 in step (which will be hereinafter abbreviated to S) 300. Then, CCID control unit 610 determines in S310 whether or not connection signal CNCT2 is ON that is, whether or not charging cable 300 and adapter 800 are connected to each other. As described later, in the case where the potential of connection signal CNCT2 is changed due to connection between charging cable 300 and adapter 800, CCID control unit 610 determines in this S310 that connection signal CNCT2 has been turned ON, based on the fact that the potential of connection signal CNCT2 has been changed to a prescribed level.

When connection signal CNCT2 is OFF (NO in S310), CCID control unit 610 recognizes that adapter 800 is not connected to charging cable 300 and the normal external charging mode is employed. Then, in S330, CCID control unit 610 sets an oscillation frequency Fcplt of pilot signal CPLT at frequency Fehr for performing external charging, and oscillates pilot signal CPLT.

On the other hand, when connection signal CNCT2 is ON (YES in S310), CCID control unit 610 recognizes that adapter 800 is connected to charging cable 300 and the mode for power feeding to outside is employed. Then, in S320, CCID control unit 610 sets oscillation frequency Fcplt of pilot signal CPLT at frequency Fsup lower than frequency Fchr during external charging (Fsup<Fchr), and oscillates pilot signal CPLT.

Figure 11:
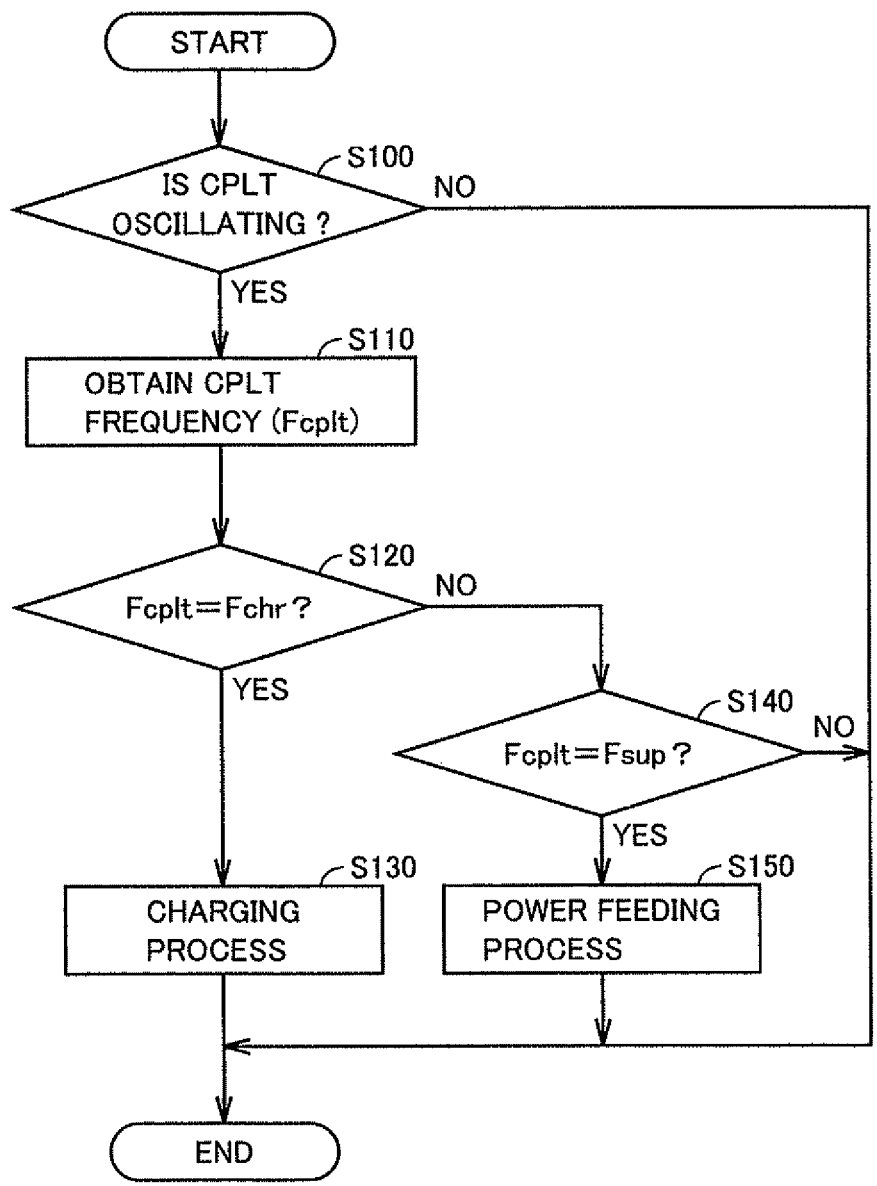
FIG. 11 is a flowchart for illustrating a control process for switching between a charging process and a power feeding process that is performed in a vehicle ECU in the first embodiment.
Figure 14:
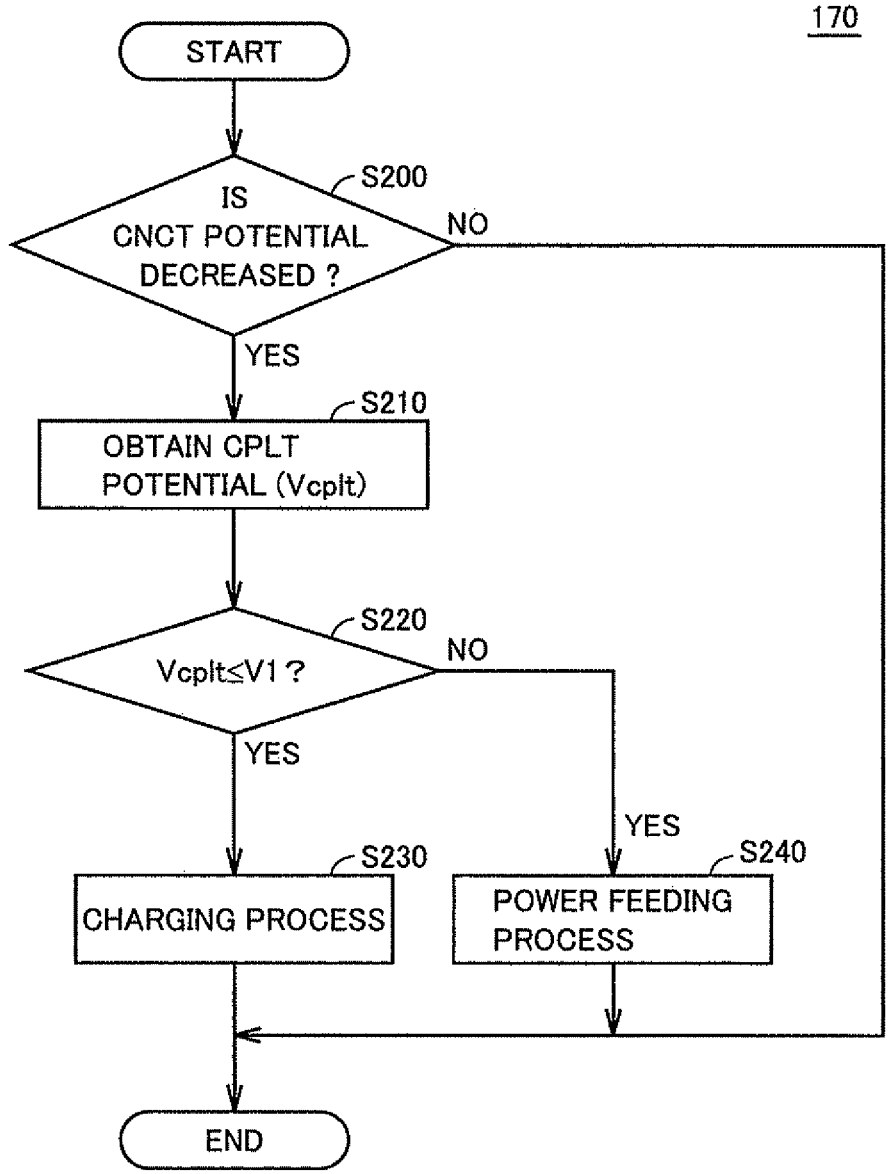
FIG. 14 is a flowchart for illustrating a control process for switching between the charging process and the power feeding process that is performed in the vehicle ECU in the modification of the first embodiment.
Figure 24:
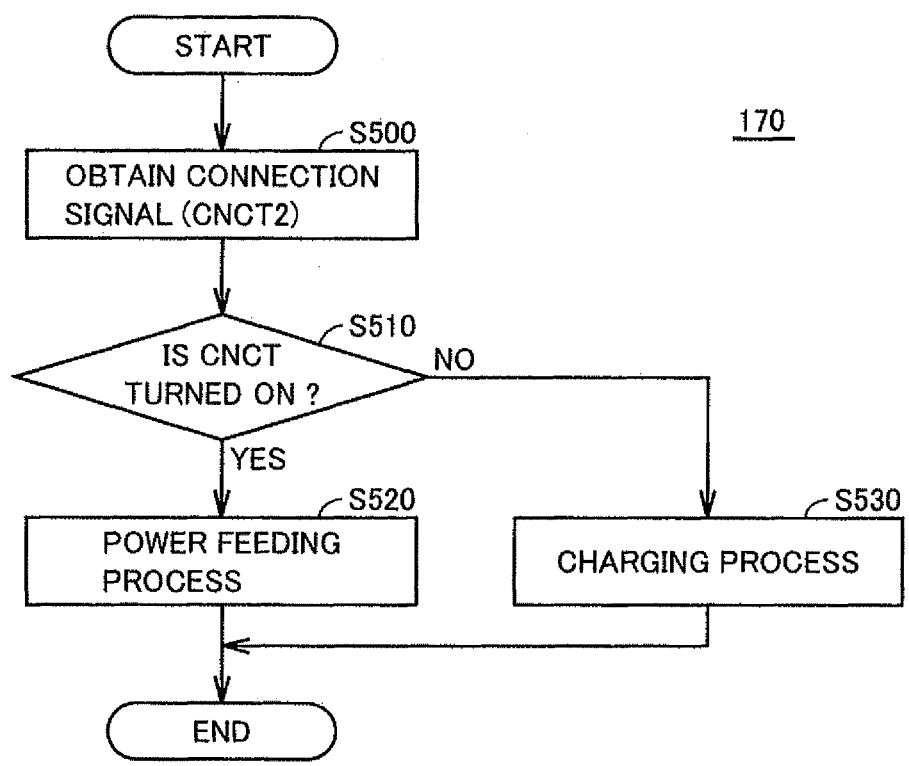
FIG. 24 is a flowchart for illustrating a control process for switching between the charging process and the power feeding process that is performed in the vehicle ECU in the second embodiment.

FIG. 11 is a flowchart for illustrating a control process for switching between a charging process and a power feeding process that is performed in vehicle ECU 170 in the first embodiment. In the flowcharts of FIG. 11 and FIGS. 14 and 24 which will be described later, the process is implemented by executing the program stored in CPU 508 of vehicle ECU 170 in advance in predetermined cycles. Alternatively, in some of the steps, the process can be implemented by constructing dedicated hardware (an electronic circuit).

Referring to FIGS. 8 and 11, CPU 508 determines in S100 whether or not pilot signal CPLT is oscillating.

When pilot signal CPLT is not oscillating (NO in S100), charging cable 300 is not connected to inlet 270, and therefore, CPU 508 ends the process.

When pilot signal CPLT is oscillating (YES in S100), CPU 508 recognizes that charging cable 300 is connected to inlet 270, and in S110, obtains oscillation frequency Fcplt of pilot signal CPLT.

Then, CPU 508 determines in S120 whether or not the obtained oscillation frequency Fcplt is equal to oscillation frequency Fchr in the case of the charging operation. In addition, in determination performed in S120, the obtained oscillation frequency Fcplt does not need to be completely equal to oscillation frequency Fchr during the charging operation, and the difference between oscillation frequency Fcplt and oscillation frequency Fchr only needs to fall within a prescribed range ($|Fcplt-Fchr|<\alpha1$).

When oscillation frequency Fcplt is equal to oscillation frequency Fchr (YES in S120), CPU 508 recognizes that adapter 800 is not connected to charging cable 300. Then, the process proceeds to S130, in which CPU 508 performs a charging process as described with reference to FIG. 3.

On the other hand, when oscillation frequency Fcplt is not equal to oscillation frequency Fchr (NO in S120), the process proceeds to S140, in which CPU 508 determines whether or not the obtained oscillation frequency Fcplt is equal to oscillation frequency Fsup during the power feeding operation. Also in this case, similarly to the case of determination in S120, the obtained oscillation frequency Fcplt does not need to be completely equal to oscillation frequency Fsup during the power feeding operation, and the difference between oscillation frequency Fcplt and oscillation frequency Fsup only needs to fall within a prescribed range ($|Fcplt-Fsup|<\alpha2$).

When oscillation frequency Fcplt is equal to oscillation frequency Fsup (YES in S140), CPU 508 recognizes that adapter 800 is connected to charging cable 300. Then, the process proceeds to S150, in which the power feeding process as described with reference to FIG. 9 is performed.

On the other hand, when oscillation frequency Fcplt is not equal to oscillation frequency Fsup (NO in S140), CPU 508 cannot determine whether the charging operation or the power feeding operation is performed, and therefore, ends the process.

By performing control in accordance with the above-described processes, in the externally chargeable vehicle, the electric power from the vehicle can be supplied to the electrical device external to the vehicle through the charging cable by using a conversion adaptor for a charging cable.

The above-described example shows the case where oscillation frequency Fsup of pilot signal CPLT at the time when adapter 800 is connected to charging cable 300 is lower than oscillation frequency Fchr at the time when adapter 800 is not connected to charging cable 300 (that is, the oscillation cycle is relatively long). In contrast, oscillation frequency Fsup may be set to be greater than oscillation frequency Fchr.

[Modification of the First Embodiment]

The explanation has been given in the above-described first embodiment with regard to the configuration in which the oscillation frequency of pilot signal CPLT is changed between the case where the adapter is connected to the charging cable and the case where the adapter is not connected to the charging cable, thereby allowing the CPU on the vehicle side to recognize whether the charging operation or the power feeding operation is to be performed.

An explanation will be given in the modification of the first embodiment with regard to the configuration in which, in place of a frequency of pilot signal CPLT, the potential of pilot signal CPLT is set at a potential different from that used during the charging operation, thereby allowing the CPU to recognize whether the charging operation or the power feeding operation is to be performed.

Figure 12:
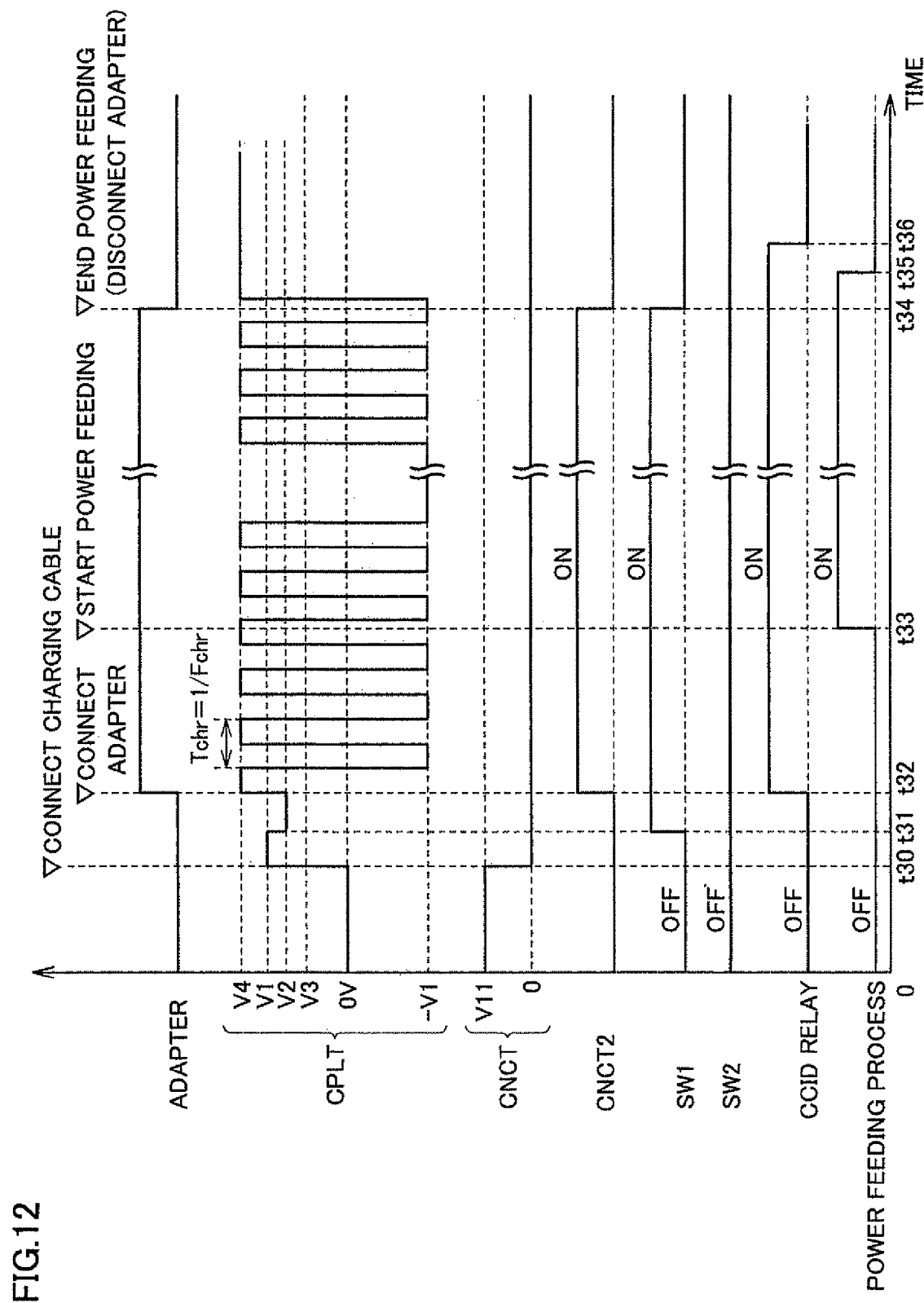
FIG. 12 is a time chart for illustrating control during power feeding in a modification of the first embodiment.

FIG. 12 is a time chart for illustrating the control during power feeding in the modification of the first embodiment. In FIG. 12, as in FIG. 9 in the first embodiment, the horizontal axis shows time while the vertical axis shows the state of connection of adapter 800, the potential of pilot signal CPLT, the potential of connection signal CNCT, the state of connection signal CNCT2, the states of switches SW1 and SW2, the state of CCID relay 332, and the execution state of the power feeding process.

Referring to FIGS. 8 and 12, at time t30. when charging cable 300 is connected to inlet 270, CCID 330 generates pilot signal CPLT. It is to be noted that, at this time t30. the potential of pilot signal CPLT is V1 (for example, 12V) while pilot signal CPLT is in a non-oscillation state.

Furthermore, when charging cable 300 is connected, the potential of connection signal CNCT is decreased by connection detecting circuit 312. CPU 508 detects that the potential of connection signal CNCT has been decreased, thereby detecting that charging cable 300 has been connected to inlet 270. In response to this, CPU 508 activates control signal S1 to turn switch SW1 to be ON (time t31). Then, as described with reference to FIG. 3, the potential of pilot signal CPLT is decreased to V2 (for example, 9V) by pull-down resistance R1 of resistance circuit 502.

At time t32. when plug 320 of charging cable 300 is connected to adapter 800, signal generation unit 850 of adapter 800 is brought into the ON state. Thereby, CCID control unit 610 recognizes that plug 320 of charging cable 300 has been connected to adapter 800. In response to this, CCID control unit 610 outputs the potential of pilot signal CPLT as a potential V4 (for example, 15V) greater than a potential V1 in the case where charging cable 300 is connected. CPU 508 of vehicle ECU 170 detects that the potential of pilot signal CPLT is V4. thereby recognizing that adapter 800 has been connected to charging cable 300. In this case, control signal S1 of switch SW1 may be kept activated or deactivated.

Then, CCID control unit 610 oscillates pilot signal CPLT. Since it can already be recognized based on the potential of pilot signal CPLT that adapter 800 is connected, the oscillation frequency at this time may be equal to oscillation cycle Tchr as in the case of external charging, or may be different therefrom. Then, CCID control unit 610 closes CCID relay 332.

When CPU 508 detects oscillation of pilot signal CPLT, it controls relay 155 and power conversion device 160, thereby performing the operation for feeding electric power to electrical device 700 (time t33 in FIG. 12).

Then, at time t34. when adapter 800 is disconnected from charging cable 300 by the user, CCID control unit 610 stops the oscillation of pilot signal CPLT. In response to this, CPU 508 ends the power feeding process (time t35 in FIG. 12) while CCID control unit 610 opens CCID relay 332 (time t36 in FIG. 12).

FIG. 13 is a flowchart for illustrating a control process for selecting a voltage of pilot signal CPLT that is performed in CCID control unit 610 in the modification of the first embodiment. FIG. 13 shows the same flowchart as that described in FIG. 10 in the first embodiment except that steps S320 and S330 are replaced with S320A and S330A, respectively. The same steps as those in FIG. 10 will not be repeated in FIG. 13.

Referring to FIGS. 8 and 13, when it is determined that connection signal CNCT2 is OFF, that is, adapter 800 is not connected to charging cable 300 (NO in S310), CCID control unit 610 sets, in S330A, a potential Vcplt of pilot signal CPLT at potential V1 for performing external charging, to oscillate pilot signal CPLT.

On the other hand, when it is determined that connection signal CNCT2 is ON, that is, adapter 800 is connected to charging cable 300 (NO in S310), CCID control unit 610 sets, in S320A, potential Vcplt of pilot signal CPLT at potential V4 for performing power feeding to outside, to oscillate pilot signal CPLT.

FIG. 14 is a flowchart for illustrating a control process for switching between the charging process and the power feeding process that is performed in vehicle ECU 170 in the modification of the first embodiment.

Referring to FIGS. 8 and 14, CPU 508 determines in S200 whether or not the potential of connection signal CNCT is decreased.

When the potential of connection signal CNCT is not decreased (NO in S200), charging cable 300 is not connected to inlet 270, and therefore, CPU 508 ends the process.

When the potential of connection signal CNCT is decreased (YES in S200), the process proceeds to S210, in which CPU 508 obtains potential Vcplt of pilot signal CPLT.

Then, CPU 508 determines in S220 whether or not the obtained potential Vcplt is not more than potential V1 at the time of the charging operation (Vcplt≤V1).

When potential Vcplt is not more than V1 (YES in S220), CPU 508 recognizes that adapter 800 is not connected to charging cable 300. Then, the process proceeds to S230, in which CPU 508 performs the charging process as described with reference to FIG. 3.

On the other hand, when potential Vcplt is greater than V1 (NO in S220), it is recognized that adapter 800 is connected to charging cable 300. Then, the process proceeds to S240, in which CPU 508 performs the power feeding process as described with reference to FIG. 11.

By performing control in accordance with the above-described processes, in the externally chargeable vehicle, the electric power from the vehicle can be supplied to the electrical device external to the vehicle through the charging cable by using a conversion adaptor for a charging cable.

[Specific Example of Signal Generation Unit]

The explanation has been given in the above with regard to the case where the signal generation unit included in the adapter is a control circuit serving to output an ON signal when the adapter and the charging cable are connected to each other, and output an OFF signal when the adapter and the charging cable are not connected to each other. Then, variations of a specific example of the signal generation unit included in the adapter will be hereinafter described with reference to FIGS. 15 to 22.

(Example 1)

Figure 15:
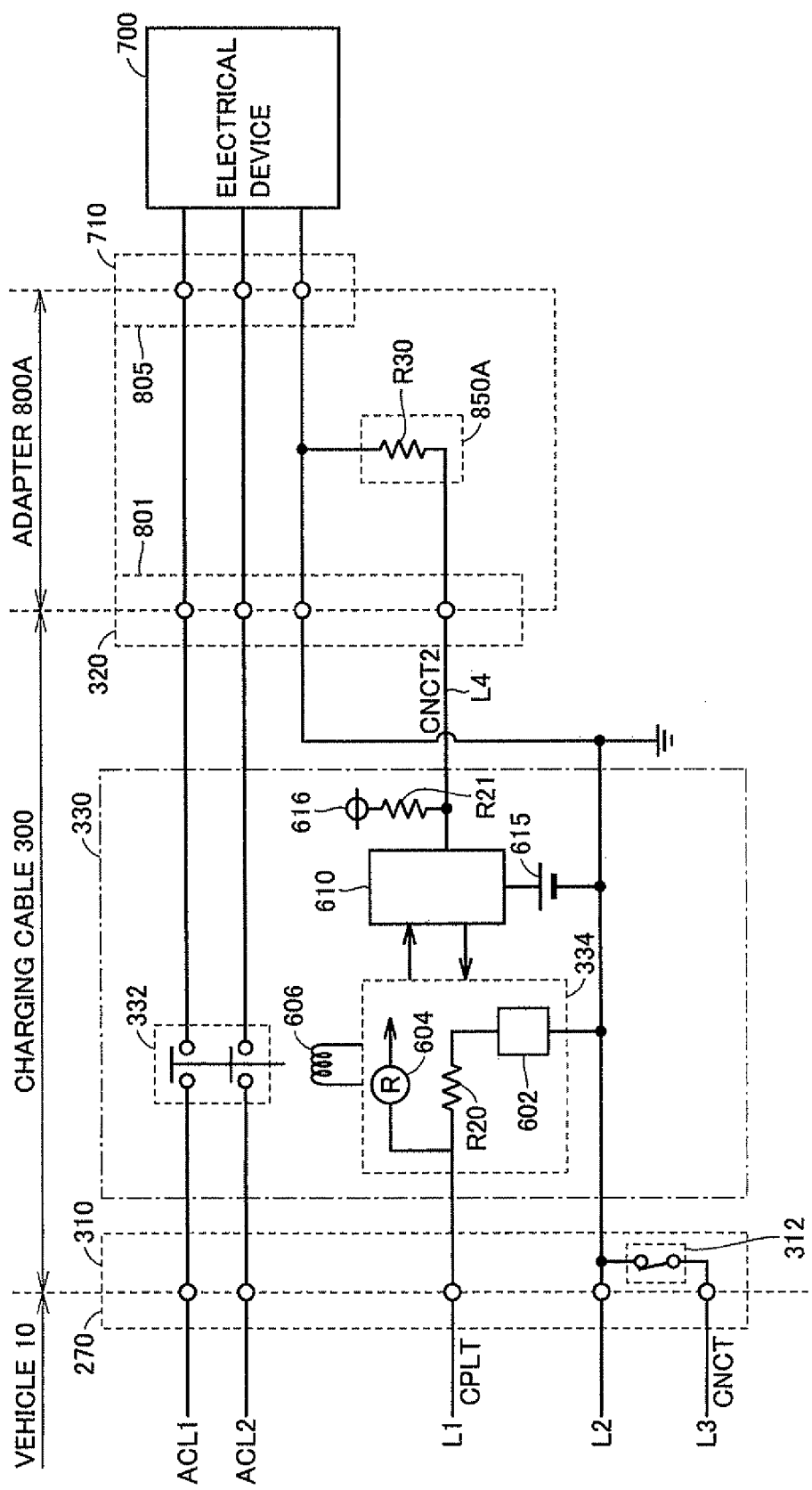
FIG. 15 is a diagram for illustrating the first example of a signal generation unit.

FIG. 15 is a diagram for illustrating an adapter 800A including a signal generation unit 850A having a resistance R30.

Referring to FIG. 15, an electric power is provided from a power supply node 616 to signal line L4 in charging cable 300 through a pull-up resistance R21. When adapter 800A is not connected to charging cable 300, the potential of signal line L4 becomes a potential set by power supply node 616.

When adapter 800A is connected to charging cable 300, signal line L4 is connected to a ground through resistance R30 included in signal generation unit 850A. This causes the potential of signal line L4 to be decreased to a potential that is obtained by dividing the potential on power supply node 616 by resistances R21 and R30.

CCID control unit 610 detects such a change in the potential of signal line L4, thereby detecting that adapter 800A has been connected to charging cable 300.

(Example 2)

Figure 16:
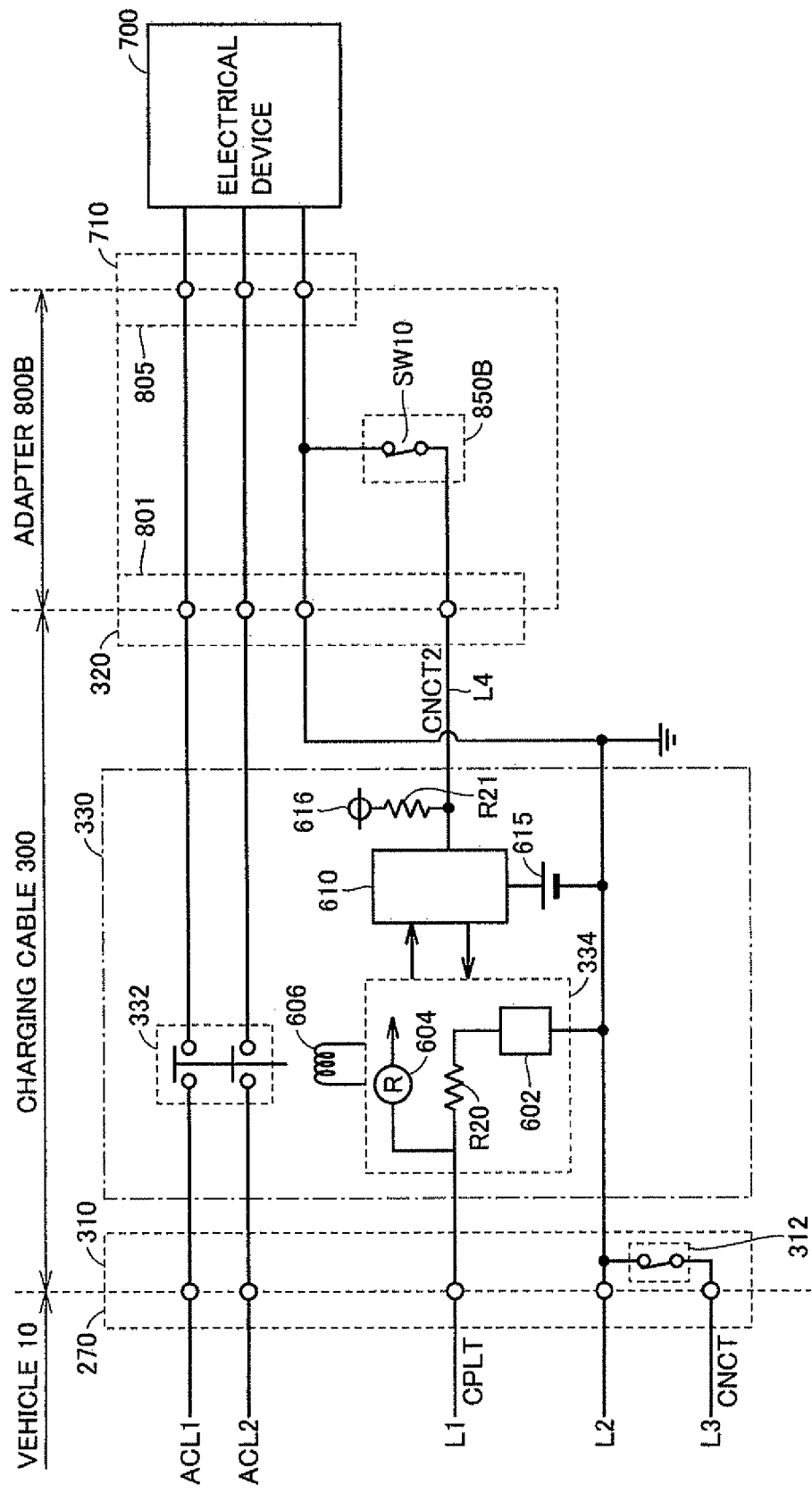
FIG. 16 is a diagram for illustrating the second example of the signal generation unit.

FIG. 16 is a diagram for illustrating an adapter 800B including a signal generation unit 850B having a switch SW10.

Referring to FIG. 16, an electric power is provided from power supply node 616 to signal line L4 in charging cable 300 through pull-up resistance R21, as in FIG. 15. When adapter 800B is not connected to charging cable 300, the potential of signal line L4 becomes a potential set by power supply node 616.

When adapter 800B is connected to charging cable 300, signal line L4 is connected to a ground via switch SW10 included in signal generation unit 850B. This causes the potential of signal line L4 to be decreased to a ground potential.

CCID control unit 610 detects such a change in the potential of signal line L4, thereby detecting that adapter 800B has been connected to charging cable 300.

(Example 3)

Figure 17:
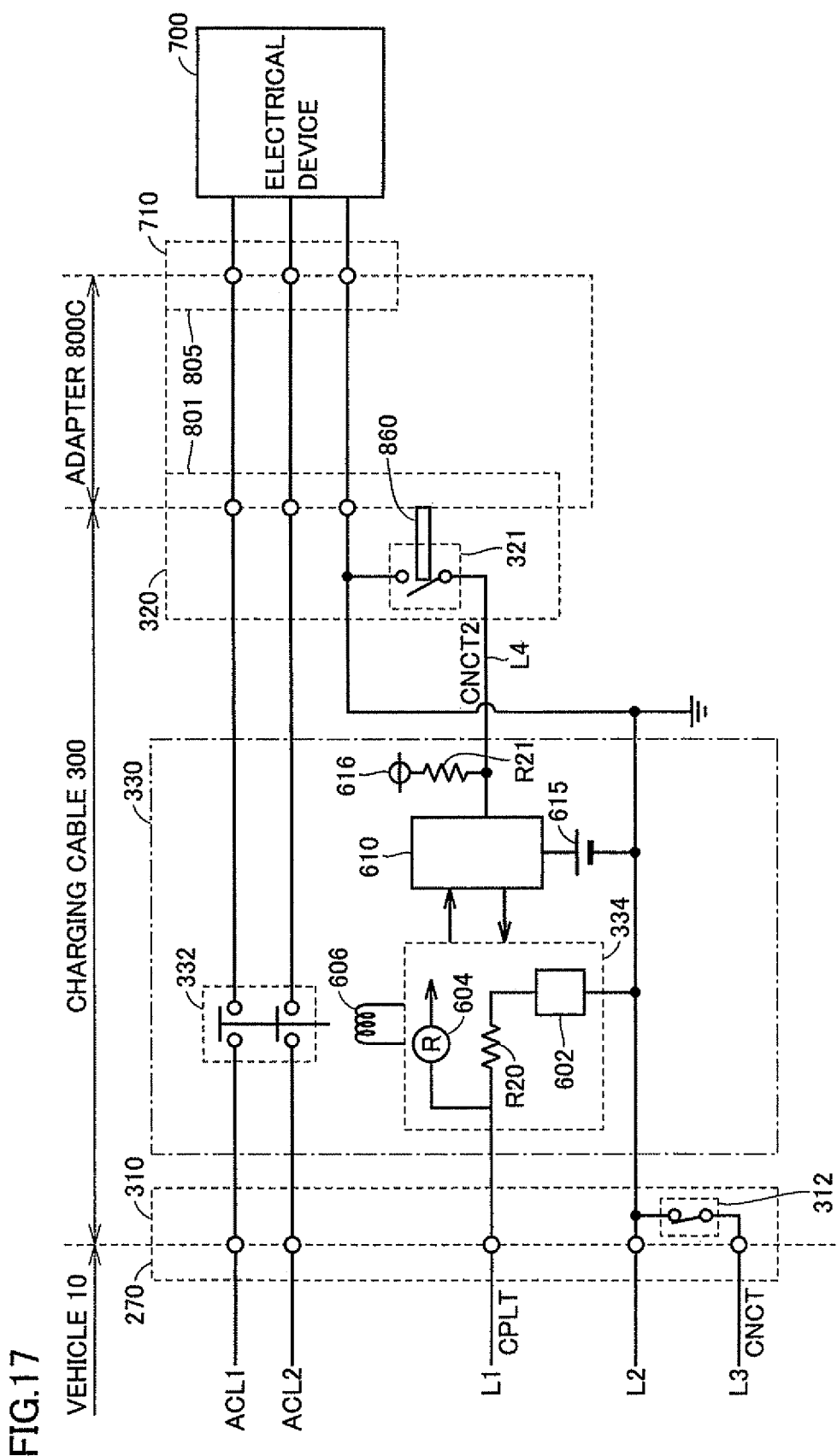
FIG. 17 is a diagram for illustrating the third example of the signal generation unit.

FIG. 17 is a diagram for illustrating an adapter 800C having an operation member 860 for operating switch 321 serving as a switching unit included in charging cable 300, as a signal generation unit.

Referring to FIG. 17, signal line L4 is connected to a ground within charging cable 300 via switch 321 included in plug 320. Furthermore, as in FIG. 15, an electric power is provided from power supply node 616 to signal line L4 in charging cable 300 through pull-up resistance R21.

As for switch 321, the contact is closed, for example, in the state where adapter 800C is not connected to charging cable 300. Therefore, when adapter 800C has not been connected, the potential of signal line L4 becomes a ground potential.

Operation member 860 is, for example, a rod-shaped member and provided in place of terminal 803 shown in adapter 800 in FIG. 5. When adapter 800C is connected to plug 320 of charging cable 300, operation member 860 directly or indirectly opens the contact of switch 321 within plug 320. This causes signal line L4 to be disconnected from a ground. Then, the potential of signal line L4 is increased from a ground potential to the potential set by power supply node 616.

CCID control unit 610 detects such a change in the potential of signal line L4, thereby detecting that adapter 800C has been connected to charging cable 300.

FIG. 17 shows the configuration in which switch 321 is closed when adapter 800C is not connected to charging cable 300 and opened when adapter 800C is connected to charging cable 300. In contrast, switch 321 may be configured to be opened when adapter 800C is not connected to charging cable 300 and closed when adapter 800C is connected to charging cable 300.

(Example 4)

Figure 18:
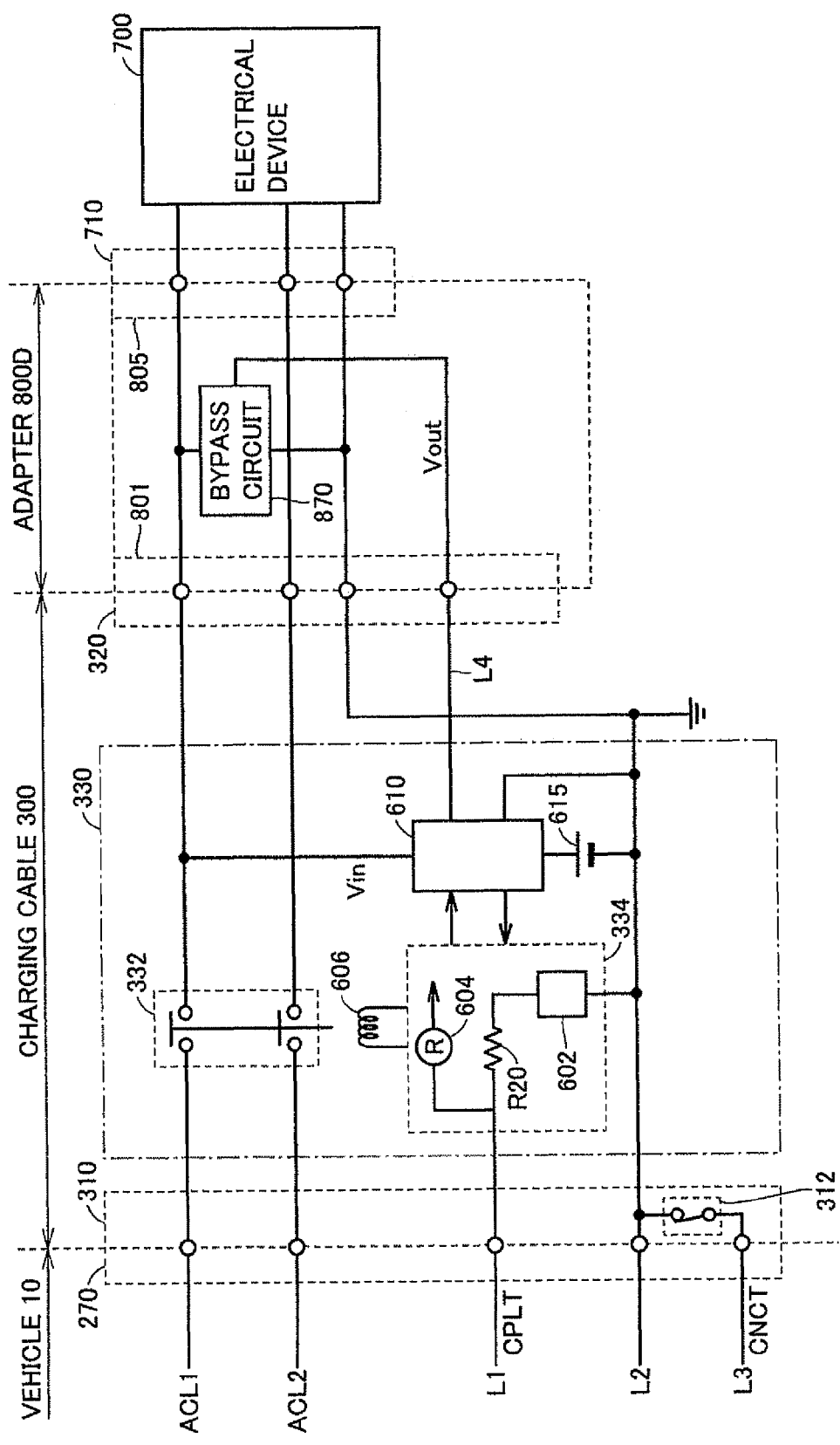
FIG. 18 is a diagram for illustrating the fourth example of the signal generation unit.

FIG. 18 is a diagram for illustrating an adapter 800D provided with a bypass circuit 870 as a signal generation unit.

Referring to FIG. 18, bypass circuit 870 is electrically connected between a ground and one of power lines 341 extending from vehicle 10 to electrical device 700. Furthermore, when adapter 800D is connected to charging cable 300, bypass circuit 870 is also connected to signal line L4 of charging cable 300.

Figure 19:
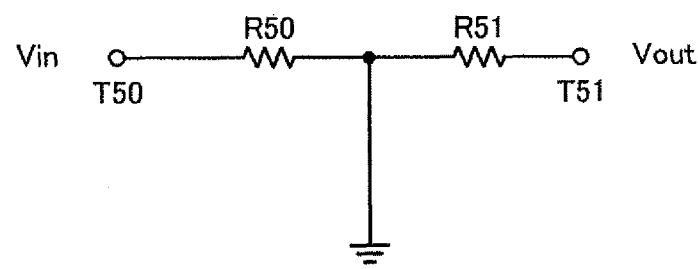
FIG. 19 is a diagram for illustrating the first example of a bypass circuit in FIG. 18.
Figure 20:
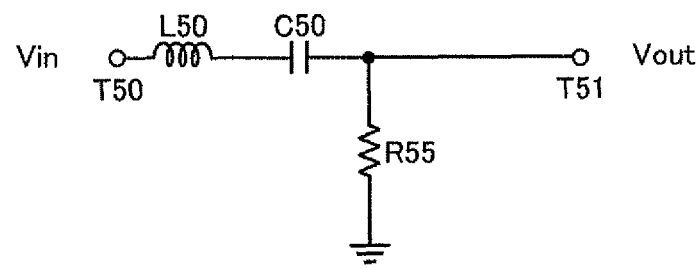
FIG. 20 is a diagram for illustrating the second example of the bypass circuit in FIG. 18.

Bypass circuit 870 has a configuration, for example, like a circuit 871 shown in FIG. 19 or a circuit 872 shown in FIG. 20.

Circuit 871 shown in FIG. 19 includes resistances R50 and R51 that are connected in series between terminals 50 and 51 electrically connected to one of power lines 341 and signal line L4, respectively. The connection node of resistances R50 and R51 is connected to a ground.

Furthermore, circuit 872 shown in FIG. 20 includes a coil L50, a capacitor C50 and a resistance R55 that are connected in series between terminal 50 and a ground. The connection node of capacitor C50 and resistance R55 is connected to terminal 51.

Again referring to FIG. 18, in such a configuration, CCID control unit 610 applies a high frequency signal Vin to the power line to which bypass circuit 870 is connected. When power line 341 is brought into conduction, a high frequency signal Vin is superimposed on its power supply voltage.

Bypass circuit 870 generates a signal Vout corresponding to high frequency signal Vin by a circuit as shown in FIGS. 19 and 20. Then, this generated signal Vout is transmitted through signal line L4 to CCID control unit 610.

In signal line L4, CCID control unit 610 detects signal Vout generated by bypass circuit 870, thereby detecting that adapter 800D has been connected to charging cable 300.

FIG. 21 is a flowchart for illustrating a control process for selecting a frequency of pilot signal CPLT that is performed in CCID control unit 610 in the case where bypass circuit 870 shown in FIG. 18 is used.

Referring to FIGS. 18 and 21, in S400, CCID control unit 610 applies high frequency signal Vin to one of the power lines continuously or for each prescribed time period. Then, in S410, while being applying high frequency signal Vin, CCID control unit 610 detects whether or not output signal Vout from bypass circuit 870 exists in signal line L4.

When output signal Vout is not detected (NO in S410), CCID control unit 610 recognizes that adapter 800D is not connected to charging cable 300. Then, the process proceeds to S440, in which CCID control unit 610 sets oscillation frequency Fcplt of pilot signal CPLT at frequency Fchr for performing external charging, to oscillate pilot signal CPLT.

On the other hand, when output signal Vout is detected (YES in S410), CCID control unit 610 recognizes that adapter 800D has been connected to charging cable 300. Then, the process proceeds to S430, in which CCID control unit 610 sets oscillation frequency Fcplt of pilot signal CPLT at frequency Fsup lower than frequency Fchr (Fsup<Fchr) in the case of external charging, to oscillate pilot signal CPLT.

In vehicle ECU 170, as described with reference to FIG. 11, the charging process and the power feeding process are switched based on oscillation frequency Fcplt of pilot signal CPLT.

(Example 5)

Figure 22:
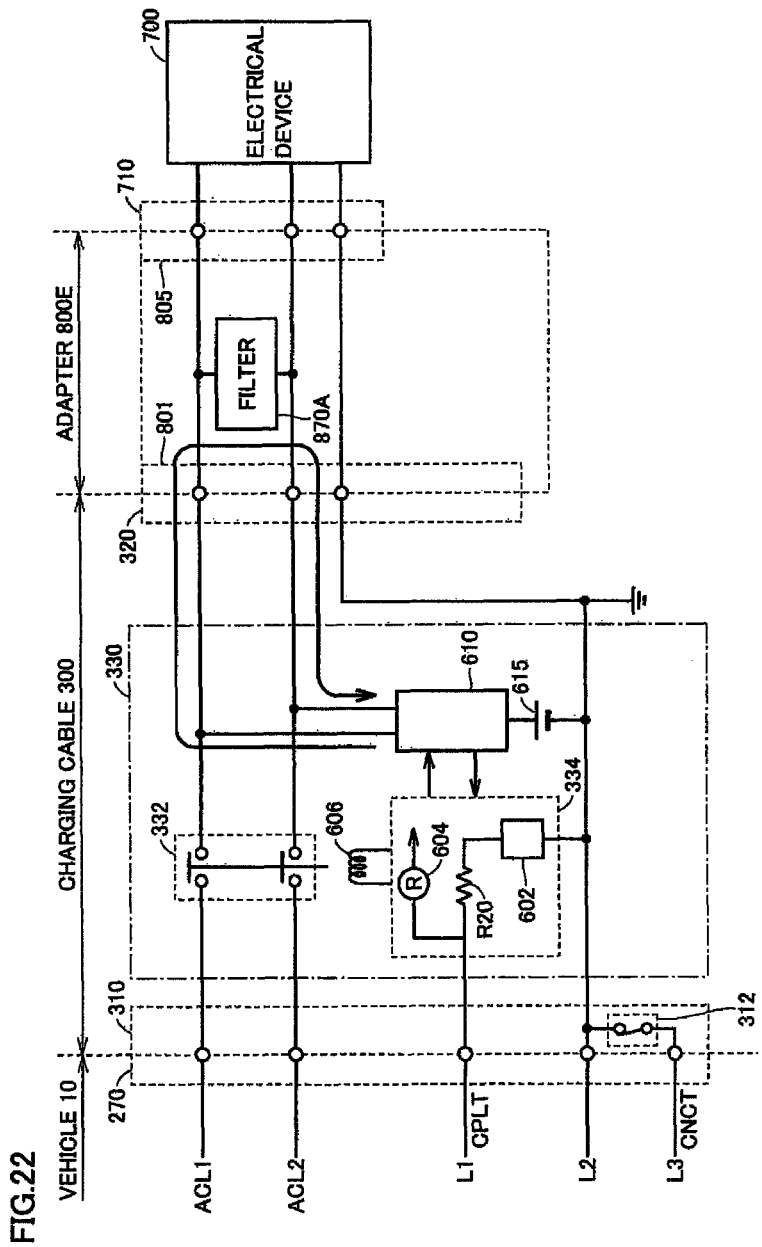
FIG. 22 is a diagram for illustrating the fifth example of the signal generation unit.

FIG. 22 is a diagram for illustrating an adapter 800E provided with a filter circuit 870A as a signal generation unit.

Referring to FIG. 22, filter circuit 870A is electrically connected between power lines 341 that each connect vehicle 10 and electrical device 700. Filter circuit 870A is, for example, a high-pass filter or a bandpass filter through which the signal passes that has a specific frequency higher than the power supply frequency transmitted via power line 341. Accordingly, filter circuit 870A allows the high frequency signal applied to one of the power lines to pass through the other of the power lines.

CCID control unit 610 applies a high frequency signal to one of the power lines. In this case, when adapter 800E is connected to charging cable 300, the applied high frequency signal is caused to pass through filter circuit 870A and appears on the other of power lines 341. Therefore, while being applying a high frequency signal to one of the power lines, CCID control unit 610 detects this high frequency signal in the other of the power lines, thereby detecting that adapter 800E is connected to charging cable 300.

[Second Embodiment]

The explanation has been given in the first embodiment with regard to the configuration in which the CCID provided in the charging cable detects that the adapter is connected to the charging cable, and the frequency and/or potential of the pilot signal output from the CCID is changed, thereby switching between the charging operation and the power feeding operation.

However, there may be a case where a charging cable not having this CCID is used as a charging cable used for performing external charging.

Thus, an explanation will be given in the second embodiment with regard to the configuration in which the electric power from the vehicle is supplied to the electrical device external to the vehicle using the charging cable not having a CCID.

Figure 23:
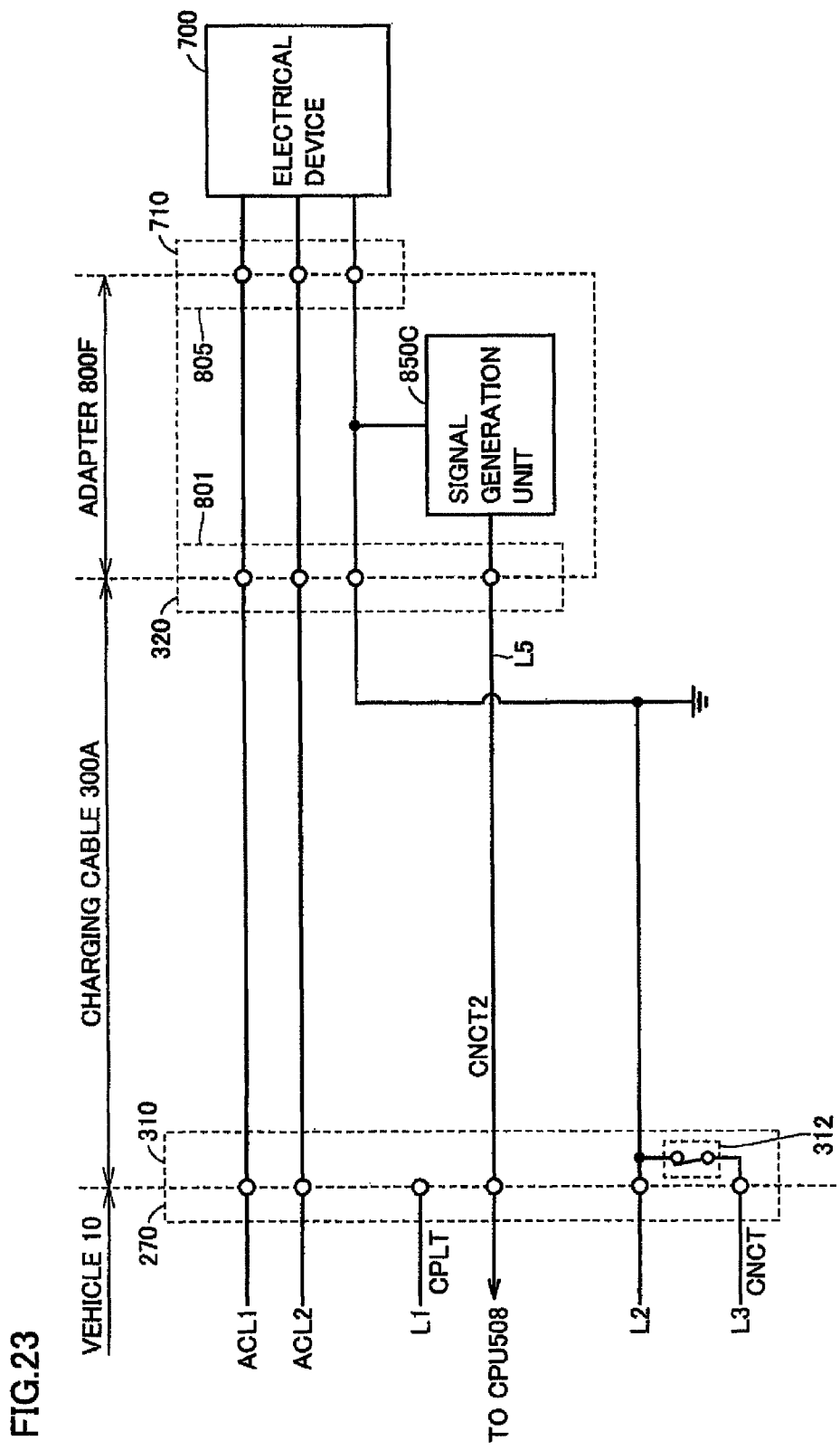
FIG. 23 is a detailed diagram of a circuit in the case where power feeding is performed through a charging cable by using an adapter in the second embodiment.

FIG. 23 is a detailed diagram of a circuit in the case where electric power is supplied through a charging cable 300A by using an adapter 800F in the second embodiment.

Referring to FIG. 23, charging cable 300A does not have CCID 330 as in charging cable 300 described in the first embodiment. Accordingly, pilot signal CPLT is not input to CPU 508 of vehicle ECU 170.

When performing external charging in such a configuration, vehicle ECU 170 generally determines whether or not the charging operation is performed based on connection signal CNCT and also on existence or non-existence of the power supply voltage supplied between power lines ACL1 and ACL2 from the external power supply.

A signal generation unit 850C included in adapter 800F is directly connected to CPU 508 of vehicle ECU 170 through a signal line L5 within charging cable 300A, and supplies connection signal CNCT2 to CPU 508. Based on connection signal CNCT2, CPU 508 detects that adapter 800F is connected to charging cable 300A, and switches between the charging operation and the power feeding operation.

FIG. 24 is a flowchart for illustrating a control process for switching between the charging process and the power feeding process that is performed in vehicle ECU 170 in the second embodiment.

Referring to FIG. 24, in S500, CPU 508 of vehicle ECU 170 obtains connection signal CNCT2 from adapter 800F. In S510, CPU 508 determines whether or not connection signal CNCT2 is ON.

When connection signal CNCT2 is OFF (NO in S510), the process proceeds to S530, in which CPU 508 performs the charging process.

On the other hand, when connection signal CNCT2 is ON (YES in S510), the process proceeds to S520, in which CPU 508 performs the power feeding process.

It is to be noted that variations of the specific example as described above are applicable as a specific configuration of the above-described signal generation unit 850C.

Alternatively, signal generation unit 850C may have a control circuit capable of outputting a signal corresponding to pilot signal CPLT of CCID 330 in charging cable 300. In this case, signal line L5 of charging cable 300A is connected to control pilot line L1 via inlet 270. Then, as described in the first embodiment, signal generation unit 850C outputs, to vehicle ECU 170 through charging cable 300A, the signal having frequency Fsup different from frequency Fchr of the pilot signal used during external charging. Based on this signal, CPU 508 detects that adapter 800F is connected to charging cable 300A, and switches between the charging operation and the power feeding operation.

As described above, also in the case of the charging cable not having a CCID, the vehicle ECU directly detects the signal from the signal generation unit provided in the adapter, thereby allowing the electric power from the vehicle to be supplied to external electrical devices through the charging cable.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 vehicle, 20 drive unit, 50, 51, 803 terminal, 120 motor generator, 130 driving wheel, 140 engine, 145 power split device, 150 power storage device, 155, 332 relay, 160 power conversion device, 170 vehicle ECU, 180 motor drive unit, 182, 604, 650 voltage sensor, 270 inlet, 300, 300A charging cable, 310, 810, 820 connector, 312 connection detecting circuit, 320 plug, 321, SW1, SW2, SW10 switch, 322, 802, 806 terminal unit, 330 CCID, 334 control pilot circuit, 340, 340A, 340B power line unit, 341, ACL1, ACL2 power line, 400 receptacle, 402 external power supply, 502 resistance circuit, 504, 506 input buffer, 508 CPU, 511, 616 power supply node, 512 vehicle ground, 602 oscillation device, 606 electromagnetic coil, 608 leakage detector, 610 CCID control unit, 615 battery, 660 current sensor, 700 electrical device, 710 power plug, 800, 800A to 800F adapter, 801, 805 connection unit, 830 cable, 850, 850A to 850C signal generation unit, 860 operation member, 870 bypass circuit, 870A filter circuit, 871, 872 circuit, C50 capacitor, L1 control pilot line, L2 ground line, L3 to L5 connection signal line, L50 coil, R1, R2, R10, R20, R21, R30, R50, R51, R55 resistance

The invention claimed is:

1. An adapter used for supplying electric power from a power source of an externally chargeable vehicle to an electrical device that is external to the vehicle using a charging cable, the power source including a power storage device, the vehicle using electric power supplied from an external power supply through the charging cable to charge the power storage device, the adapter comprising:

a first connector configured to connect to a power plug of the charging cable, which allows for electrical power from the power source of the vehicle to be supplied to the electrical device;

a second connector electrically connected to the first connector, the second connector being configured to connect to a power plug of the electrical device; and a processor configured to generate a signal instructing power feeding based on a connection between the adapter and the charging cable, wherein in response to the signal instructing power feeding, the vehicle supplies the electric power from the power source to the electrical device through the charging cable connected to the vehicle, the vehicle includes: (i) a power conversion device configured to convert the electric power from the power source to supply the converted electric power to the charging cable, and (ii) a first control device configured to control power conversion device, and the charging cable includes a second control device configured to transmit and receive a signal to and from the first control device.

2. The adapter according to claim 1, wherein by connection between the adapter and the charging cable, the processor supplies, to the second control device, a signal showing the connection between the adapter and the charging cable to cause the second control device to output the signal instructing power feeding to the first control device, and in response to the signal instructing power feeding, the first control device drives the power conversion device to supply the electric power from the power source to the electrical device.

3. The adapter according to claim 2, wherein the processor changes a potential of a signal path connected to the second control device to supply the signal showing the connection between the adapter and the charging cable to the second control device.

4. The adapter according to claim 3, wherein the processor includes a resistor and electrically connects the signal path to a ground through the resistor by connection between the adapter and the charging cable.

5. The adapter according to claim 3, wherein processor includes a switch and electrically connects the signal path to a ground via the switch by connection between the adapter and the charging cable.

6. The adapter according to claim 3, wherein the charging cable includes a switching unit configured to switch between conduction and non-conduction between the signal path and a ground, and the processor includes an operation member configured to allow a conducting state of the switching unit to be changed by connection between the adapter and the charging cable.

7. The adapter according to claim 6, wherein the switching unit is a switch, the switch is in a conducting state in a state where the adapter and the charging cable are not connected, and the operation member brings the switch into a non-conducting state by connection of the adapter to the charging cable.

8. The adapter according to claim 2, wherein the processor outputs, to the second control device, a signal responding to reception of a signal transmitted from the second control device using a pair of power transmission paths in the charging cable as a signal showing connection between the adapter and the charging cable, to cause the second control device to output the signal instructing power feeding to the first control device.

9. The adapter according to claim 8, wherein the processor includes a bypass circuit configured to: (i) branch a part of a high frequency signal transmitted from the second control device to one of the pair of power transmission paths, and (ii) output the branched signal to the second control device.

10. The adapter according to claim 8, wherein the processor includes a filter circuit configured to cause a high frequency signal transmitted from the second control device to one of the pair of power transmission paths to pass through the other of the power transmission paths.

11. The adapter according to claim 2, wherein the signal instructing power feeding is output from the second control device to the first control device, the signal instructing power feeding utilizing a pilot signal used for transmitting information about a current capacity of the charging cable, when performing external charging.

12. The adapter according to claim 11, wherein the signal instructing power feeding is output using a frequency different from a frequency of the pilot signal used during external charging.

13. The adapter according to claim 11, wherein the signal instructing power feeding is output using a potential different from a potential of the pilot signal used during external charging.

14. The adapter according to claim 1, wherein
by connection between the adapter and the charging cable, the processor outputs the signal instructing power feeding to the control device through a signal line included in the charging cable, and
in response to the signal instructing power feeding, the control device drives the power conversion device to supply the electric power from the power source to the electrical device.

15. The adapter according to claim 14, wherein the processor outputs, to the control device, a signal responding to reception of a signal transmitted from the control device through a pair of power transmission paths of the charging cable as the signal instructing power feeding.

16. A vehicle externally chargeable using electric power that is supplied from an external power supply using a charging cable to charge a power storage device mounted in the vehicle, the power storage device being configured to feed electric power to an external electrical device by connection of an adapter to the charging cable, the adapter including:
a first connector configured to connect to a power plug of the charging cable, which allows for electrical power from the power source of the vehicle to be supplied to the electrical device, and
a second connector electrically connected to the first connector, the second connector being configured to connect to a power plug of the electrical device,
the vehicle comprising:
a power source including the power storage device;
an inlet configured to connect to the charging cable during external charging;
a power conversion device configured to convert electric power from the power source to supply the converted electric power to the inlet; and
a first control device configured to control the power conversion device, wherein
in response to reception of a signal instructing power feeding that is generated by connection between the adapter and the charging cable, the first control device drives the power conversion device to supply the electric power from the power source to the electrical device, and
the charging cable includes a second control device configured to transmit and receive a signal to and from the first control device.

17. The vehicle according to claim 16, wherein
the power source further includes:
an internal combustion engine, and
a rotating electric machine configured to be driven by the internal combustion engine to generate electric power, and
the electric power generated by the rotating electric machine is supplied to the electrical device through the charging cable and the adapter.

18. A method for feeding electric power from a power source of an externally chargeable vehicle to an external electrical device by connection of an adapter to a charging cable, the power source including a power storage device, the vehicle using electric power supplied from an external power supply through the charging cable to charge the power storage device,
the vehicle including:
an inlet configured to connect to the charging cable during external charging, and
a power conversion device configured to convert the electric power from the power source to supply the converted electric power to the inlet, and
a first control device configured to control the power conversion device,
the adapter including:
a first connector configured to connect to a power plug of the charging cable, which allows for electrical power from the power source of the vehicle to be supplied to the electrical device, and
a second connector electrically connected to the first connector, the second connector being configured to connect to a power plug of the electrical device, and
the charging cable including a second control device configured to transmit and receive a signal to and from the first control device,
the method comprising steps of:
connecting the charging cable to the inlet;
connecting the power plug of the charging cable to the first connector of the adapter;
connecting the power plug of the electrical device to the second connector of the adapter;
receiving a signal instructing power feeding that is generated by connection between the adapter and the charging cable; and
controlling the power conversion device, in response to the signal instructing power feeding, to supply the electric power from the power source to the electrical device.

19. The vehicle according to claim 16, wherein
by connection between the adapter and the charging cable, the controller supplies, to the second control device, a signal showing the connection between the adapter and the charging cable to cause the second control device to output the signal instructing power feeding to the first control device.

20. The method according to claim 18, wherein
by connection between the adapter and the charging cable, the controller supplies, to the second control device, a signal showing the connection between the adapter and the charging cable to cause the second control device to output the signal instructing power feeding to the first control device, and in response to the signal instructing power feeding, the first control device drives the power conversion device to supply the electric power from the power source to the electrical device.

\* \* \* \* \*